United States Patent [19]
Kaplan et al.

[11] Patent Number: 5,581,780
[45] Date of Patent: *Dec. 3, 1996

[54] STORED STRING DATA WITH NEXT AND ALTERNATIVE INFORMATION A PROCESSOR CAN USE TO REACH NEXT AND ALTERNATIVE LOCATIONS IN MEMORY

[75] Inventors: Ronald M. Kaplan, Palo Alto; Martin Kay, Menlo Park; John Maxwell, Sunnyvale, all of Calif.

[73] Assignee: Xerox Corporation, Stamford, Conn.

[ * ] Notice: The portion of the term of this patent subsequent to Sep. 12, 2012, has been disclaimed.

[21] Appl. No.: 451,094

[22] Filed: May 25, 1995

Related U.S. Application Data

[63] Continuation of Ser. No. 855,129, Mar. 18, 1992, Pat. No. 5,450,598, which is a continuation of Ser. No. 619,821, Nov. 29, 1990, abandoned, which is a continuation of Ser. No. 274,701, Nov. 15, 1988, abandoned, which is a continuation of Ser. No. 814,146, Dec. 27, 1985, abandoned.

[51] Int. Cl.$^6$ ........................................ G06F 9/00
[52] U.S. Cl. .............. 395/800; 364/943.42; 364/DIG. 2; 395/793; 395/795
[58] Field of Search ..................... 395/800, 425; 364/419.12, 419.13, 943.42, DIG. 2

[56] References Cited

U.S. PATENT DOCUMENTS

| | | | |
|---|---|---|---|
| Re. 31,287 | 6/1983 | Patic | 340/825.79 |
| 4,241,402 | 12/1980 | Mayper et al. | 395/600 |
| 4,285,049 | 8/1981 | Bird et al. | 395/483 |
| 4,293,783 | 10/1981 | Patil | 326/40 |
| 4,366,551 | 12/1982 | Holtz | 364/419.1 |
| 4,376,982 | 3/1983 | Bantz et al. | 395/285 |
| 4,450,520 | 5/1984 | Hollaar et al. | 395/550 |
| 4,644,461 | 2/1987 | Jennings | 395/650 |

(List continued on next page.)

FOREIGN PATENT DOCUMENTS 162255  11/1985  European Pat. Off. .
WO850181  4/1985  WIPO .

OTHER PUBLICATIONS

Haskin, R. L., and Hollar, L. A., "Operational Characteristics of a Hardware–Based Pattern Matcher", ACM Transactions on Database Systems, vol. 8, No. 1, Mar. 1983, pp. 15–40.

(List continued on next page.)

*Primary Examiner*—Alyssa H. Bowler
*Assistant Examiner*—John Harrity

[57] ABSTRACT

An FSM data structure is encoded by generating a transition unit of data corresponding to each transition which leads ultimately to a final state of the FSM. Information about the states is included in the transition units, so that the encoded data structure can be written without state units of data. The incoming transition units to a final state each contain an indication of finality. The incoming transition units to a state which has no outgoing transition units each contain a branch ending indication. The outgoing transition units of each state are ordered into a comparison sequence for comparison with a received element, and all but the last outgoing transition unit contain an alternative indication of a subsequent alternative outgoing transition. The indications are incorporated with the label of each transition unit into a single byte, and the remaining byte values are allocated among a number of pointer data units, some of which begin full length pointers and some of which begin pointer indexes to tables where pointers are entered. The pointers may be used where a state has a large number of incoming transitions or where the block of transition units depending from a state is broken down to speed access. The first outgoing transition unit of a state is positioned immediately after one of the incoming transitions so that it may be found without a pointer. Each alternative outgoing transition unit is stored immediately after the block beginning with the previous outgoing transition unit so that it may be found by proceeding through the transition units until the number of alternative bits and the number of branch ending bits balance.

20 Claims, 12 Drawing Sheets

U.S. PATENT DOCUMENTS

| | | | |
|---|---|---|---|
| 4,713,754 | 12/1987 | Agarwal et al. | 395/600 |
| 4,723,211 | 2/1988 | Barker et al. | 395/147 |
| 4,739,477 | 4/1988 | Barker et al. | 395/600 |
| 4,758,955 | 7/1988 | Chen | 364/419.12 |
| 4,771,385 | 9/1988 | Egami et al. | 364/419.13 |
| 4,782,464 | 11/1988 | Gray et al. | 364/419.12 |
| 4,783,761 | 11/1988 | Gray et al. | 364/419.12 |
| 4,866,605 | 9/1989 | Nakano et al. | 395/500 |
| 4,882,703 | 11/1989 | Nicolai | 395/600 |
| 4,991,135 | 2/1991 | Yoshimura et al. | 364/419.13 |
| 5,325,091 | 6/1994 | Kaplan | 341/51 |

OTHER PUBLICATIONS

Srihari, N. S.; Hull, J. J.; Choudhari, R., "Integrating Diverse Knowledge Sources in Text Recognition", ACM Transactions on Office Information Systems, vol. 1, No. 1, Jan. 1983, pp. 68–87.

Carlgren, R. G., "Language–Independent Dictionary Storage and Access Technique", IBM Technical Disclosure Bulletin, vol. 26, No. 11, Apr. 1984, pp. 6085–6086.

Turba, T. N., "Checking for Spelling and Typographical Errors in Computer–Based Text", Sigplan Notices, vol. 16, No. 6, Jun. 1981, pp. 51–60.

Liang, "Word Hy–phen–a–tion by Com–put–er", Stanford University, Department of Computer Science; 1983, pp. 8–28 and 39–44.

Hull et al., "An Integrated Algorithm for Text Recognition: Comparison with a Cascaded Algorithm", IEEE Transactions on Pattern Analysis and Machine Intelligence, vol. PAMI–5, No. 4, Jul. 1983, pp. 384–395.

Knuth, "The Art of Computer Programming", vol. 3; Sorting and Searching, Addison–Wesley, 1973, pp. 481–505.

Peterson, "Computer Programs for Spelling Correction: An Experiment in Program Design", Lecture Notes in Computer Science 96, Springer–Verzag, New York, Oct. 1980, pp. 57–66.

Maly, "Compressed Tries", Communications of the ACM, vol. 19, No. 7, Jul. 1976, pp. 409–415.

Agerwala, "Putting Pelvi Nets to Work", IEEE Computer, Dec. 1979, pp. 85–94.

| ADDRESS | LABEL | SUCCESS PTR. | ALT. PTR. | FINAL | ALT. | EOB |
|---|---|---|---|---|---|---|
| 1 | A | 2 | - | 1 | 0 | 0 |
| 2 | B | 3 | 4 | 0 | 1 | 0 |
| 3 | D | - | - | 1 | 0 | 1 |
| 4 | C | 5 | - | 0 | 0 | 0 |
| 5 | D | - | 6 | 1 | 1 | 1 |
| 6 | E | - | - | 1 | 0 | 1 |

| ADDRESS | LABEL | FINAL | ALT. | EOB |
|---|---|---|---|---|
| 1 | A | 1 | 0 | 0 |
| 2 | B | 0 | 1 | 0 |
| 3 | D | 1 | 0 | 1 |
| 4 | C | 0 | 0 | 0 |
| 5 | D | 1 | 1 | 1 |
| 6 | E | 1 | 0 | 1 |

| Label (L)/Pointer (P) | | Characteristics |
|---|---|---|
| 0 | | |
| 247 - 6N | P | SHORT |
| 248 - 6N | | |
| 253 - 6N | P | MIDSIZE |
| 254 - 6N | | |
| 255 - 6N | P | LONG |
| 256 - 6N | | |
| 255 - 5N | L | |
| 256 - 5N | | |
| 255 - 4N | L | FINAL |
| 256 - 4N | | |
| 255 - 3N | L | ALT., FINAL, EOB |
| 256 - 3N | | |
| 255 - 2N | L | ALT. |
| 256 - 2N | | |
| 255 - N | L | ALT., FINAL |
| 256 - N | | |
| 255 | L | FINAL, EOB |

*FIG. 4*

| | | |
|---|---|---|
| | 0 | INDEX HEADER |
| | L | |
| | L + 1 | CHAR 1 ASCII |
| | . | . |
| | L + N | CHAR N ASCII |
| | L + N + 1 | SHORT POINTER ( 1 ) |
| | . | . |
| | L + N + S | SHORT POINTER ( S ) |
| | L + N + S + 1 | MIDSIZE POINTER ( 1 ) |
| | . | . |
| | L + N + S + M | MIDSIZE POINTER ( M ) |
| | L + N + S + M + 1 | CHAR 1 FIRST TRANSITION |
| | . | . |
| | L + N ( B + 1 ) + S + M | CHAR N FIRST TRANSITION |
| | L + N ( B + 1 ) + S + M + 1 | TRANSITION UNITS AND POINTERS IN OVERALL SEQUENCE FROM POINTER LIST |

FIG. 10

STORED STRING DATA WITH NEXT AND ALTERNATIVE INFORMATION A PROCESSOR CAN USE TO REACH NEXT AND ALTERNATIVE LOCATIONS IN MEMORY

This is a continuation of application Ser. No. 07/855,129, filed Mar. 18, 1992 now U.S. Pat. No. 5,450,598, which was a continuation of application Ser. No. 07/619,821, filed Nov. 29, 1990 now abandoned, which was a continuation of application Ser. No. 07/274,701, filed Nov. 15, 1988 now abandoned, which was a continuation of application Ser. No. 06/814,146, filed Dec. 27, 1985 now abandoned.

BACKGROUND OF THE INVENTION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates to techniques for encoding finite state machine (FSM) data structures. More specifically, this invention relates to the storage of an FSM data structure in a compact encoded form.

U.S. Pat. Nos. 4,241,402 and 4,285,049 each relate to a finite state automaton which receives signals and, based on the received signals and on control tables, steps from a present state along a transition to a next state, eventually reaching a report state dependent on the received signal sequence. The signals may, for example, be a sequence of character elements. The control tables contain information from a finite state machine ("FSM") data structure. In general, FSM data structures include information about states and transitions between states, and the information in a specific data structure may be encoded in many ways. The encodings disclosed in U.S. Pat. Nos. 4,241,402 and 4,285,049 are conventional in that each unit of data, there called a state word, includes part of a state control table which controls the transitions from a specific state to other states. The state word may include, for example, a memory address used to obtain the address of a following state word.

It would be advantageous to have a way to encode an FSM data structure more compactly than can be achieved with the conventional techniques without sacrificing any of the information in the data structure.

SUMMARY OF THE INVENTION

The present invention provides techniques for encoding FSM data structures very compactly without loss of information. The present invention further provides techniques for reducing the time necessary to use such a compactly encoded FSM data structure to test a string of characters or other elements.

One aspect of the present invention is based on the recognition that the information in an FSM data structure may be tied to the transitions rather than to the states. For example, the information that a state is a final state, the end of a sequence of received signals which is covered by the data structure, can be stored as an additional bit with the information about each of the transitions leading to that state. Similarly, other information about a state can be stored with the information about the transitions which lead to or exit from that state. Since FSM data structures typically have several possible transitions from each state, only a few of which lead eventually to a final state, it is typically more efficient to store the information in relation to the transitions which lead to final states rather than storing the information about all possible transitions in relation to each state.

An additional aspect of the present invention is based on the recognition that an FSM in general may be viewed as a data processing system which, upon receiving an input element, determines whether that element corresponds to a label associated with a first one of the outgoing transitions from the present state of the FSM. Each transition of the FSM has a label associated with it which can be compared with a received element to determine whether the label and the element correspond. In this case, if they correspond, the FSM follows that first outgoing transition to a next state and receives the next input element, but if not, the FSM determines whether alternative outgoing transitions from the present state exist, in which case the FSM goes to one of the alternative outgoing transitions and determines whether the input element corresponds to its label, and so forth. In this view of an FSM, the FSM may be thought of as moving through its data structure, making primarily two types of movement—(1) the movement to a first outgoing transition from a next state if a received element matches the label of a transition leading to that next state and (2) the movement to an alternative outgoing transition from a present state if a received element does not match the label of an attempted outgoing transition from the present state. As noted above, it is conventional to include addresses, referred to herein as pointers, in an encoded data structure to indicate the movements which may be made. The present invention provides an encoding in which these two types of movement can often be made without the explicit storage of pointers.

This aspect of the invention is further based on the recognition that one of these types of movements, to the alternative outgoing transition, may be encoded based on a feature of the non-matching outgoing transition and the states and transitions which depend from it in the FSM data structure. More specifically, if special indications are stored with the non-matching outgoing transition and the transitions depending from it, those indications can be used in finding the alternative outgoing transition These special indications are of two types, one of which indicates that a transition has a subsequent alternative outgoing transition and the other of which indicates that a transition leads to a state which has no outgoing transitions, meaning it is at the end of a branch of the data structure. When as many of the second type of indication as of the first type of indication have been encountered, the next transition in the encoded data structure is the alternative outgoing transition. No pointer is needed to move to the alternative outgoing transition.

This aspect of the invention is also based on the recognition that the other primary type of movement, to the first outgoing transition from a state may be encoded simply as an increment in the memory location currently being accessed in the encoded data structure. In other words, the first outgoing transition from a state may be stored immediately after and adjacent to one of the transitions leading to that state, and no pointer is needed to move to the first outgoing transition. Combining these two techniques for encoding the movements greatly reduces the number of pointers in the encoded data structure, without reducing the information stored.

Another aspect of the present invention is based on the recognition that, in some instances, the size of the encoded data structure may actually be reduced by including a pointer to a transition. This will be true in some instances where a transition in the FSM data structure to be encoded may follow more than one state. The transition must, of course, be stored once, but if that transition, together with the part of the data structure which depends from it, occupies more storage than a pointer to it would occupy, the subsequent movements to it can be made with less memory space by using a pointer. Furthermore, the total amount of memory space can be reduced by representing pointers to transitions which have many pointers to them using pointer data units with fewer bits than a full length pointer, i.e., one containing enough bits to address any transition unit in the encoded data structure. In other words, the pointer data units will have more than one length, including the full pointer length.

Another aspect of the present invention is based on the recognition that the amount of information which must be stored for each transition may be compressed into fewer bits than if a fixed number of bits are used for its associated label, with additional bits for indications or flags. By judicious selection of the bit combination or byte value corresponding to each of the labels, all the information about the indications or flags may be stored in a single byte, together with the label. As noted above, the pointers may be represented by units of pointer data of more than one length, depending on frequency of occurrence, and these pointer data units may each begin with a first byte whose value differs from the byte values corresponding to labels and also indicates the length of a pointer data unit. The shorter pointer data units may then identify locations in tables at which full length pointers are stored.

Another aspect of the present invention is based on the recognition, noted above, that many useful FSM data structures are sparse, meaning that, for most states, many of the possible outgoing transitions do not lead to final states and need not be included in the encoding. For example, if the FSM data structure corresponds to or covers a list of words in the English language, most of the states need only have outgoing transitions for a few of the characters of the alphabet. In operation, the FSM will treat the failure to find a transition with a label corresponding to a received character as a movement to a special transition, leading to a failure state. The size of the encoded data structure is reduced. Also the time necessary to determine whether a received word is on the list may be reduced by ordering the transitions which do occur from a given state according to a predetermined prioritization. If the label of a transition being considered corresponds to a character lower in the predetermined ordering than the received character, then it is not necessary to compare with subsequent transitions—the received character cannot correspond to any of them.

One method of encoding an FSM data structure according to the invention includes generating a set of transition units for a state of the FSM. The set of transition units includes a subset of incoming transition units and a subset of outgoing transition units. In a further step, information about the state is included in the set of transition units.

For a state with at least one outgoing transition, a first outgoing transition unit may be generated, while for a state with more than one outgoing transition, at least one alternative outgoing transition unit may be generated. The first and alternative outgoing transition units may be ordered into a comparison sequence permitting comparison of a received element until a transition unit with a matching label is found.

The location of the first outgoing transition unit from a state may be encoded by positioning that transition unit immediately after one of the incoming transition units to that state. Similarly, the location of each subsequent alternative outgoing transition may be encoded by including alternative and branch ending indications in the transition units and by ordering the transition units so that the subsequent alternative outgoing transition is positioned immediately after the transition unit at which the counts of alternative and branch ending indications will balance within a block beginning with the previous outgoing transition unit. Within each block, the transition units may be ordered so that each first outgoing transition unit immediately follows an incoming transition unit to the state in which it originates.

Typically, the FSM whose data structure is encoded will accept a number, finite or infinite, of strings of received elements, with certain states being final states following transitions which correspond to the last element of one of the strings. During encoding, transition units may be generated only for those transitions which correspond to one of the elements of an acceptable string, and each incoming transition unit leading to a final state may include an indication of finality. The indication of finality, like the alternative and branch ending indications, may be encoded together with the transition unit's label into a single byte. All state units may thus be omitted, because the transition units contain all the information about the states as well as the transitions.

An apparatus for encoding an FSM data structure according to the invention includes means for generating a set of transition units for a state of the FSM, including incoming transition units and outgoing transition units. The apparatus also includes means for including information about the state in the set of transition units.

A stored encoding of an FSM data structure according to the invention includes a memory with a plurality of memory locations, and transition units stored in the memory locations, including both incoming transition units and outgoing transition units to a state. The transition units include information about the state. The outgoing transition units may include a first outgoing transition unit and alternative outgoing transition units, ordered into a comparison sequence so that their labels may be compared to a received element until a matching transition unit is found.

A method of using the stored encoding according to the invention begins with receiving elements of a string. An outgoing transition unit of the FSM's start state is accessed. Beginning with the first element in the string, the elements are compared with the label of the currently accessed transition unit. If the element corresponds, the first outgoing transition unit of the destination of the currently accessed transition unit is next accessed. If not, and if the currently accessed transition unit has an alternative, the alternative is next accessed. If there is no alternative, a failure signal is provided. This continues until each of the elements has been matched or until a failure is indicated. If the transition unit which matches the last element of the string does not lead to a final state, a failure will also be indicated.

An apparatus for determining whether a string of elements is in the stored encoding according to the invention includes the stored encoding, means for receiving the elements of the string in sequence, means for accessing one of the transition units and retrieving it, means for comparing its label with an element of the string, and means for testing whether it has an alternative. In addition, controlling means control the receiving means, accessing means, comparing means, and testing means to operate by first accessing an outgoing transition unit of the FSM's start state, and to proceed to compare each element of the string to the currently accessed transition unit. If the comparison succeeds, the next element is compared with the label of the first outgoing transition unit of the destination of the currently accessed transition unit, but if not, the present element is compared with the alternative transition unit. If there is no alternative failure is signalled.

Another method of encoding a data structure according to the invention includes generating a set including incoming and outgoing transition units and positioning one of the incoming transition units in relation to one of the outgoing transition units so that the outgoing transition unit can be found from the position of the incoming transition unit without a pointer. Yet another method of encoding a data structure according to the invention includes generating a set including a first outgoing transition unit and alternative outgoing transition units and positioning the outgoing transition units in relation to each other so that each alternative outgoing transition unit can be found based on the position of a preceding outgoing transition unit without a pointer.

Further objects, features and advantages of the invention will become apparent from the following detailed description and the appended claims, together with the attached drawings.

BRIEF DESCRIPTION OF THE DRAWINGS

FIG. 3 is a graphical FSM representation of the states and transitions of part of a simple FSM data structure.

FIG. 4 is a byte map showing how the values which a byte may take will include some values containing a label and additional information and other values which are pointer data units.

FIG. 10 is a memory map showing the file containing the encoded FSM data structure written according to the routine of FIG. 9.

DETAILED DESCRIPTION OF PREFERRED EMBODIMENTS

A. General Description

Figure 1:
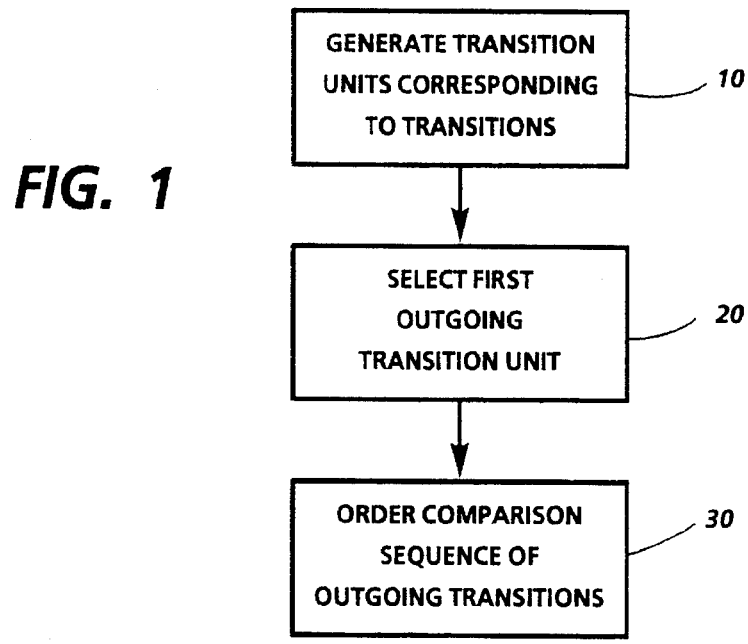
FIG. 1 is a flow diagram showing the major features of the technique of encoding an FSM data structure according to the invention.
Figure 2:
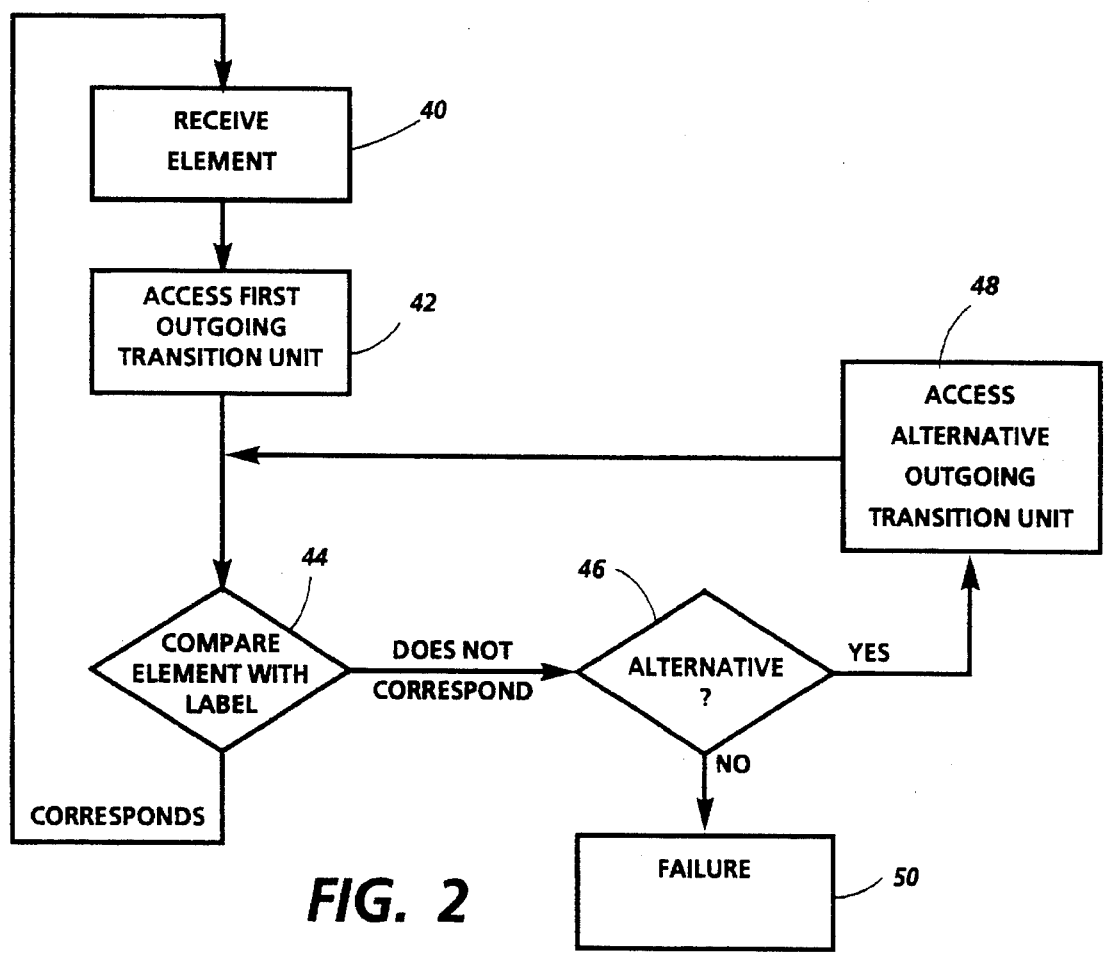
FIG. 2 is a flow diagram showing how the comparison sequence of outgoing sequences according to the invention is followed in comparing a received element such as a character with the labels of the outgoing transitions of a state.

FIGS. 1 and 2 show several basic features of the present invention. FIG. 1 shows some of the major features in flow diagram form, illustrating their logical relationship. FIG. 2 is a more detailed flow chart showing how an FSM data structure encoded according to the invention may be compared with a received element such as a character.

In FIG. 1, box 10 shows that the encoding of an FSM data structure according to the invention includes generating transition units of data, each corresponding to a transition of the data structure. As noted above, an FSM data structure contains states and transitions between the states. A major feature of the present invention is that units of data in the encoded data structure correspond to the transitions, but the encoded data structure nonetheless includes all necessary information relating to the states. As shown below, this permits an extremely compact encoding of the data structure, preserving both the information about the specific states and transitions and also the information about their relationships.

One type of information about the relationships between states and transitions is the set of outgoing transitions from a given state. Box 20 in FIG. 1 illustrates that one feature of the present invention is to select or identify one of the transition units which correspond to the outgoing transitions as a first outgoing transition unit. Then, as shown in box 30, if there are more than one outgoing transition, the outgoing transition units can be ordered into a comparison sequence beginning with the first outgoing transition unit. This feature permits all of the outgoing transition units to be found based on the location of the first outgoing transition unit.

FIG. 2 shows in more detail how the comparison sequence may be used in comparing a received element with outgoing transition units of a state in the FSM data structure. In box 40, the element to be compared is received. The first outgoing transition unit ("T.U.") from the current state is accessed from memory in box 42. The received element is compared with the label from the retrieved transition unit in box 44, resulting in a determination that it does or does not correspond with that label. If it does not correspond, a determination is made in box 46 whether the retrieved transition unit has a subsequent alternative outgoing transition unit. If so, the alternative is accessed in box 48, and the comparison is again made in box 44. If not, however, the received element has failed to correspond to any of the outgoing transition units of the present state of the FSM data structure, and the failure state is entered in box 50.

If, on the other hand, the received element corresponds to the retrieved label in box 44, the process may begin again by receiving the next element in box 40. In this case, however, the outgoing transition units to be accessed in boxes 42 and 48 will be those of the state to which the successfully compared transition unit leads. This illustrates how, if the FSM data structure covers a set of strings such as character strings, a string of received characters may be compared in sequence to determine whether that string is in that set.

Copending application Ser. No. 06/814,147, now abandoned, also assigned to the assignee of the present invention and incorporated herein by reference, relates to checking the spelling of words using an encoded FSM data structure of this type.

With these features of the invention in mind, we turn to encoding techniques according to the invention.

B. Basic Encoding Techniques

The encoding of an FSM data structure according to the invention could be done in many ways. FIGS. 3A, 3B, 3C and 4 illustrate basic encoding techniques which result in a compactly encoded data structure.

Figures 3A, 3B, 3C:
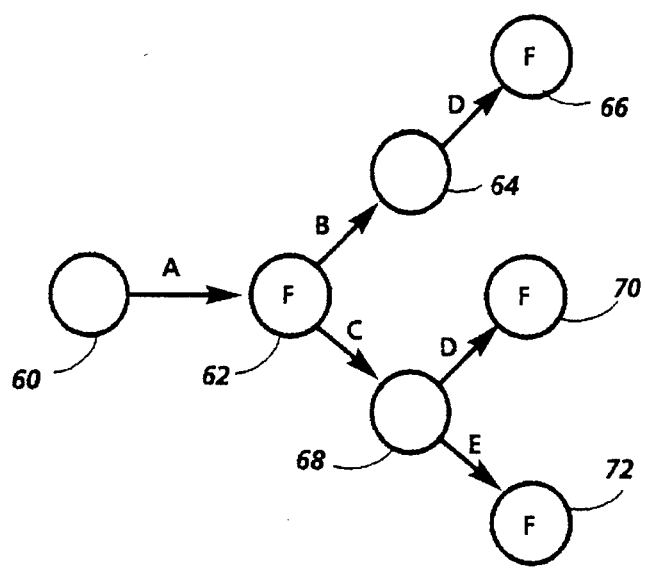
FIG. 3B shows a sequence of transition units corresponding to the FSM data structure of FIG. 3A, ordered according to the invention.
FIG. 3C shows a more compressed form of the sequence of transition units of FIG. 3B.

FIG. 3A shows part of a simple FSM data structure in graphical form, with the states shown as circles and the transitions between states shown as lines with arrows. State 60 may be referred to as the start state, while states 62, 66, 70 and 72 are all final states, shown as a letter "F" in a circle, meaning that one of the strings of elements covered by the data structure ends in each of those states. Note that the data structure of FIG. 3A includes only the transitions which ultimately lead to states marked final, while the transitions which do not ultimately lead to final states have been omitted. In addition, the elements are represented by the characters A through E, and these characters thus serve as the labels of the transitions between the states which ultimately lead to final states. State 62 illustrates that a final state need not be at the end of a branch of the data structure, but may be at any state in the data structure.

FIG. 3B shows one encoding of the data structure of FIG. 3A into transition units according to the invention. The information in the encoded data structure is shown as alphanumeric characters, although it will typically be stored in binary form in a memory. The memory addresses are shown in the left column, followed by a column showing the label field at each address. After the label field at each address are two fields for pointers, one to the transition unit which follows if the label corresponds to a received element and one to the subsequent alternative outgoing transition unit, if any. Each transition unit also includes a number of bit fields, as shown, which provide information about the transition to which it corresponds or the state to which it leads.

The information in FIG. 3B corresponds in a straightforward manner to the FSM data structure of FIG. 3A. The transition unit at address 1, for example, corresponds to the transition between states 60 and 62, and therefore has the character A in its label field. Its success pointer field contains the address of the first outgoing transition unit of state 62, which corresponds to the transition to state 64. If a received element corresponds to the label A at address 1, the transition unit at address 2 will be accessed for comparison with the next received element. Since state 60 has only one outgoing transition, there is no alternative outgoing transition unit, so that the alternative pointer field at address 1 contains no pointer and the alternative bit is set to zero. As shown in FIG. 3A, state 62 is a final state, so that the final bit at address 1 is accordingly set to one. State 62 has two outgoing transitions, so that it is not the end of a branch of the data structure, and the end of branch ("EOB") bit at address 1 is also set to zero. In a similar manner, the transition unit at address 2 corresponds to the transition between states 62 and 64; address 3 corresponds to that between states 64 and 66; address 4 corresponds to that between states 62 and 68; address 5 corresponds to that between states 68 and 70; and address 6 corresponds to that between states 68 and 72.

The information in FIG. 3B includes information not only about the transitions in FIG. 3A, but also about the states and the relationships between states and transitions. The information about each transition in FIG. 3A includes its label, of course, and the information about each state includes the indication of whether or not it is final. The label is encoded in the label field of each transition unit corresponding to a transition, and the final bit is encoded in each transition unit corresponding to one of the transitions leading into a final state, so that these items of information are encoded entirely in the transition units. Similarly, all the information about the relationships between states and transitions is encoded, though not quite as simply. The set of transitions leading to a state can be found by finding the transition units whose success pointer fields have the address of the first outgoing transition from that state. The set of transitions leaving a state may similarly be found from any of the transition units leading to that state, and includes the first outgoing transition unit, with its address in the success pointer field of each of the incoming transition units, together with the alternative transition units, each of whose addresses will be in the alternative pointer field of the first outgoing transition unit or of one of the other alternative transition units.

From the above analysis of the information in FIG. 3B, it can be seen that the alternative and EOB bits are redundant. The alternative bit is set to one only when there is an alternative pointer, while the EOB bit is set to one only when there is no success pointer. This suggests that these bits could be eliminated, but FIG. 3C is an encoding of the same data structure in which these bits are retained, while the success and alternative pointers are eliminated, resulting in a greater reduction in the space needed for the encoded data structure than if the alternative and EOB bits were eliminated. This compaction is possible in part because the transition units are ordered into subsequences so that the first outgoing transition unit from each state immediately follows one of the transition units leading into that state. Also, the transition units are ordered so that each subsequent alternative outgoing transition unit immediately follows the transition units depending from the previous outgoing transition unit from the same state.

In FIG. 3C, one of the subsequences of transition units includes addresses 1-3, all containing first outgoing transition units. Another subsequence includes addresses 4 and 5, with the transition unit at address 4 leading to the state whose first outgoing transition unit is at address 5. In other words, each of the first outgoing transition units in the FSM data structure of FIG. 3A is encoded so that it immediately follows the transition unit leading to it. Therefore, if a received character corresponds to a label from a transition unit, no success pointer is necessary to find the first outgoing transition unit from the resulting state—it can be found simply by incrementing the memory address being accessed.

Similarly, the transition units of FIG. 3C are ordered so that the subsequent alternative outgoing transition units at addresses 4 and 6 each follow immediately after the transition units depending from the preceding outgoing transition units at addresses 2 and 5, respectively. Within each set of transition units including and depending from a transition unit which has an alternative bit, the last transition unit will be the only one for which the total number of EOB bits encountered is equal to the number of alternative bits encountered. The EOB bit at address 3 is thus paired with and balanced against the alternative bit at address 2, while the EOB bit and the alternative bit at address 5 balance each other. In each case, the subsequent alternative outgoing transition unit can be found by proceeding through the addresses, keeping track of the alternative and EOB bits, and incrementing to the next address when the alternative bits and EOB bits balance. Here again, no alternative pointer is necessary.

Although the encodings shown in FIGS. 3B and 3C each include the entire FSM data structure in FIG. 3A, the encoding techniques according to the invention could be applied to any appropriate part of an FSM data structure. Furthermore, as will be seen below, pointers can be retained in the encoded data structure where appropriate, either to reduce its size or to increase speed of comparison with a received string. Also, as discussed in greater detail below, the information in each of the transition units of FIG. 3C can be further compressed, primarily because, for an FSM data structure with no failure states, the final bit cannot be zero when the EOB bit is one. This further compression also makes possible the efficient use of pointer data units of more than one length.

The encoded FSM data structure will typically be stored in a memory having bytes of 8-bit length. FIG. 4 is an example of a byte map of all 256 values which an 8-bit byte may take, including both those values which contain a label and additional information and those values which are allocated to pointer data units.

The byte values allocated to pointer data units are illustratively divided into three blocks, corresponding to the first bytes of three types of pointer data units—short and medium length pointer indexes and full length pointers, being, for example, one, two and three bytes in length, respectively. Each short or medium length pointer index is actually an offset used to access a table entry at which the full length pointer to the transition unit to be accessed is stored, while each full length pointer provides the pointer itself, and may be more than three bytes in length if necessary to address all locations used. To provide a substantial number of the short length pointer indexes, it is preferable that they be allocated most of the pointer data unit byte values. In the example shown, all but eight byte values are allocated to short pointer indexes, with six of those remaining eight allocated to the first bytes of medium length pointer indexes and two allocated to the first bytes of full length pointers. This arrangement is somewhat arbitrary, however, and other divisions of the byte values might be appropriate. In FIG. 4, the first block of byte values is allocated to short length pointer indexes; the next six byte values to midsize or medium length pointer indexes; and the last two byte values to long or full length pointers.

FIG. 4 assumes that the labels may take any one of N distinct values, and for English alphabetical characters, N will be an integer greater than 26 so that it can include characters such as the hyphen and apostrophe. Each such extra character could be encoded as a single escape character in combination with an ordinary alphabetic character. This would keep N small, leaving more byte values for use as pointer data units. For each of the six possible combinations of the final, alternative and EOB bits, a block of N values will be allocated as shown. In the byte map of FIG. 4, the bits which have a value of one in each block are shown in that block, but the particular arrangement of the blocks in FIG. 4 is somewhat arbitrary, and the blocks could be ordered in a number of other arrangements.

As noted above, two combinations, in which the final bit is zero and the EOB bit is one, cannot occur unless the FSM data structure includes a failure state, so that the use of only six out of the eight possible combinations of bit values depends on having a data structure without failure states. In effect, the failure state is reached whenever a received string cannot be matched by a series of transitions in the data structure, the last of which has a final bit of one.

The basic features of encoding illustrated in FIGS. 3A–3C and 4 can be applied in many ways, and an example of an encoding method according to the invention which includes some of those features is set forth below.

C. An Encoding Method

Figure 5:
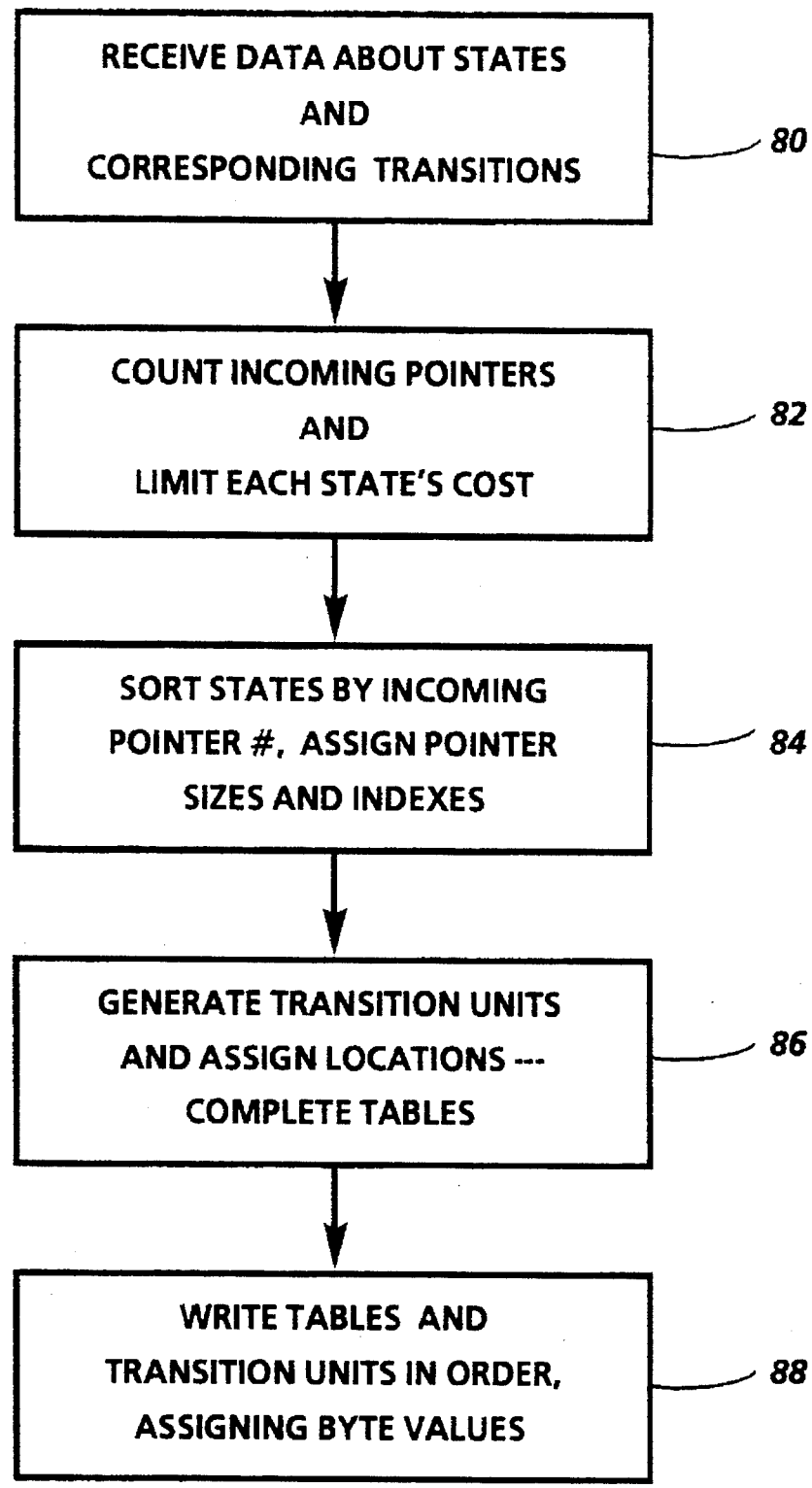
FIG. 5 is a flowchart showing steps by which an FSM data structure may be encoded according to the invention.

Since FSM data structures are conventionally encoded with units of data corresponding to the states of the data structure, a complete process of encoding an FSM data structure according to the invention ordinarily includes both generating transition units from these conventional state units and ordering the transition units appropriately. In addition, the encoding process may include steps whose effect is to compress the encoded FSM data structure. FIG. 5 is a flowchart illustrating encoding according to the invention in which the steps effecting compression occur at several points during the generation and ordering of the transition units. FIGS. 6–9 are more detailed flowcharts of parts of the encoding in FIG. 5.

The encoding in FIG. 5 begins with the receiving of a body of data including data about states and data about the corresponding outgoing transitions of those states, as shown in box 80. An example of such a body of data would be the FSM data structure corresponding to a set of words as disclosed in copending application Ser. No. 06/814,147, now abandoned, also assigned to the assignee of the present invention and incorporated herein by reference. The data about each state will typically include a listing of the transitions leading from that state and an indication of whether that state is the end of one or more words in the set. The data about each transition will include its label and an indication of the state which is its destination.

The data about each state which determines the order of related transition units must then be obtained in box 82. The transition units, as discussed above, are ordered into a sequence which can reduce the need for pointers in the encoded data structure, because the first and alternative outgoing transitions can be reached by movements through the sequence. Pointers remain necessary, however, if the data structure includes a transition which loops to a preceding state. Pointers also remain desirable, as discussed in greater detail below, where a state has more than one incoming transition, so that the transitions depending from that state need be stored only once and where an extremely long block of transition units may be broken down into subblocks using pointers, so that the movements through the sequence will not be unduly slow. In order to allocate pointers of different lengths efficiently, it is useful to count the incoming pointers to each state, as shown in box 82. Box 82 also shows that the cost of each state, meaning the number of bytes which the block of transition units dependent on that state will occupy in the encoded file, is limited by breaking off subblocks.

As noted above, a pointer will be assigned to the block of transition units which follows each state having more than one incoming transitions, provided that the pointer is shorter than the block of transition units to which it points. In order to identify such states, the count of incoming pointers to each state may, for example, be incremented for each of that state's incoming transitions after the first. Pointers will also be assigned to subblocks which have been moved out of lengthy blocks of transition units in order to limit a state's cost in terms of the length of the block of transition units which will follow it in the encoded data structure, which will govern the time necessary to pass through that state on the way to an alternative transition unit. A count will also be kept of the incoming pointers to the state preceding each such subblock. Box 84 shows that the states are sorted according to the number of incoming pointers, and a pointer size and a pointer or index of that size are then assigned to the first outgoing transition unit of a state having incoming pointers and whose dependent block of transition units is longer than the pointer size. The shortest pointer indexes are assigned to the states with the most incoming pointers, and so forth, until all the pointer indexes are assigned, and then the full length pointers are assigned.

Once the pointer indexes and pointers are assigned, the transition units are generated and locations are assigned to the transition units, as shown in box 86. One way of doing so is to take the data from a state unit about each outgoing transition which leads ultimately to a final state and expand it to include a field into which a location can be placed. Transitions which do not lead ultimately to a final state can be omitted. When the locations are assigned, it becomes possible to complete the pointer tables from which each actual memory location can be obtained using the corresponding pointer index. In addition, during this step a table can be made up containing the locations of the transition units from the start state, to increase the speed of access.

Also, for any other state having a large number of outgoing transitions, a similar table could be made up and included, for example, with the first outgoing transition from that state to increase access speed. If indexes of the type disclosed in U.S. Pat. Nos 4,241,402 and 4,285,049 are used as the tables, with each bit indicating whether a corresponding character has a transition from a specific state, a saving in space may actually be realized for states with many outgoing transitions, since it will not be necessary to store the labels of the outgoing transitions separately from the table. To indicate use of a table, one byte value from FIG. 4, could be reserved to indicate that the next following series of bytes are a character table of a predetermined length. The value of a received character could be added to the present address to find the bit indicating whether that character has a transition leading ultimately to a final state. In general, however, the use of tables may be advantageous for states with many outgoing transitions because it replaces the character bytes for those transitions with a fixed number of bits.

In box 88, the tables and transition units are written to a file in order according to their locations. A byte value is assigned to each transition unit based on its label and on whether it has an alternative, is final, or is the end of a branch, as discussed above. Before the byte values are written, however, it will be appropriate to provide a table for converting the received characters to values corresponding to the values of the labels in the transition units. Then, a number of locations in the file are used for storing the initial transition or first character table and the pointer tables. Finally, the sequence of transition units and pointers themselves may be put into the file. At this point, the file is complete, and can be put into use in the manner discussed below.

Figure 6:
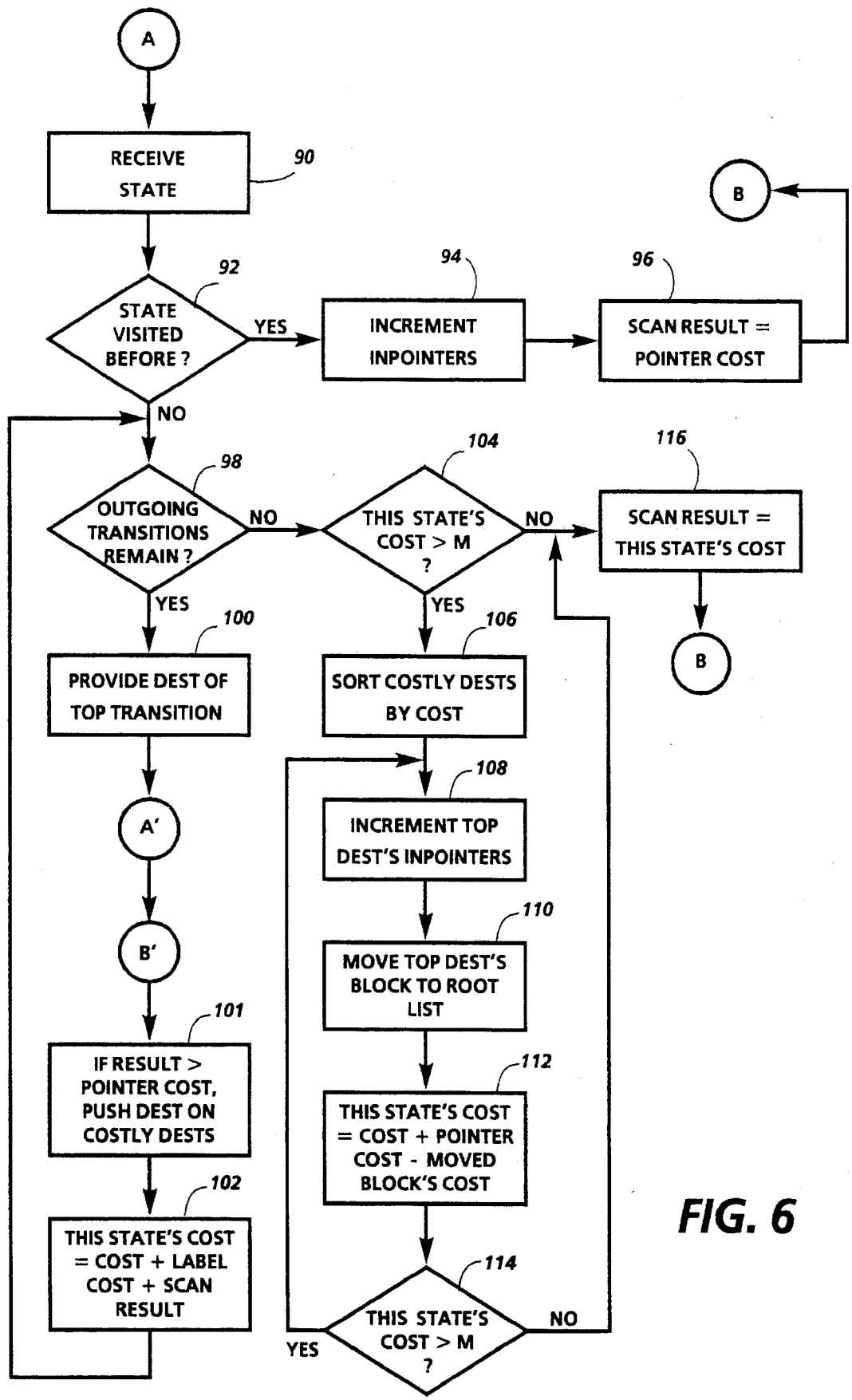
FIG. 6 is a flowchart showing a routine which may be used in FIG. 5 to count the incoming pointers to each state of an FSM data structure and to limit the cost of each state.
Figure 7:
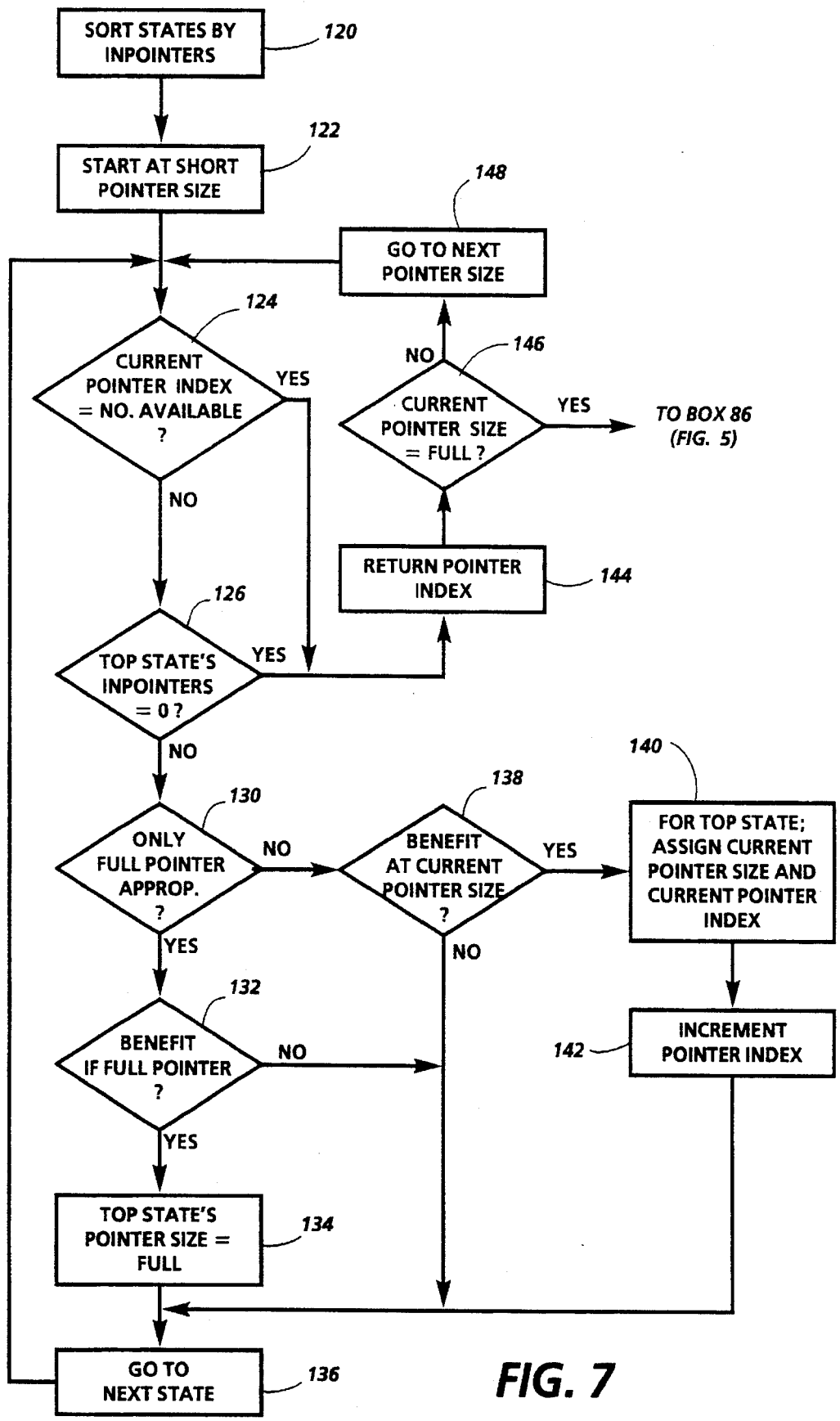
FIG. 7 is a flowchart showing a routine which may be used in FIG. 5 to assign pointer sizes and indexes to the states of an FSM data structure.
Figure 8:
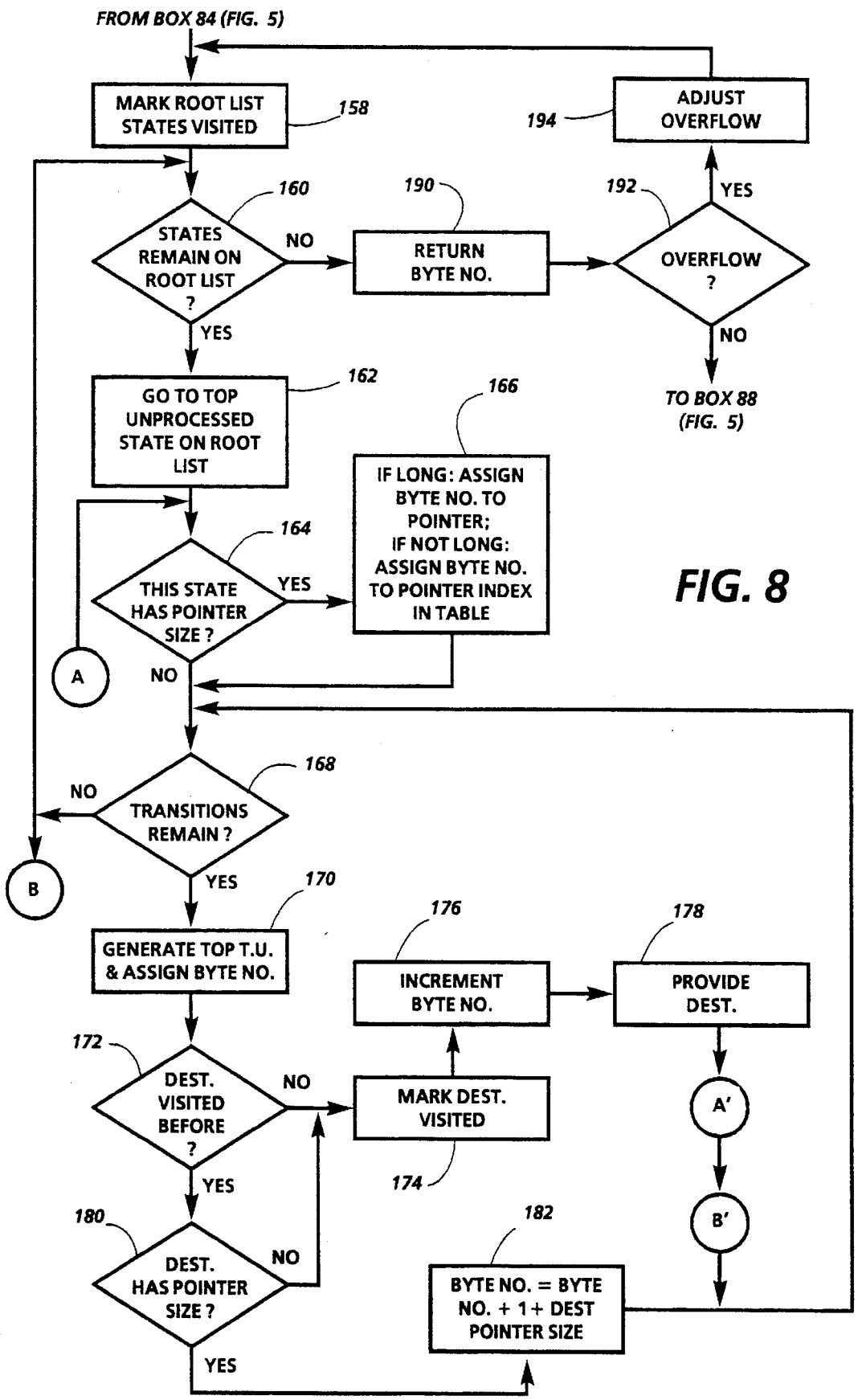
FIG. 8 is a flowchart showing a routine which may be used in FIG. 5 to assign locations to the transition units of the FSM data structure.
Figure 9:
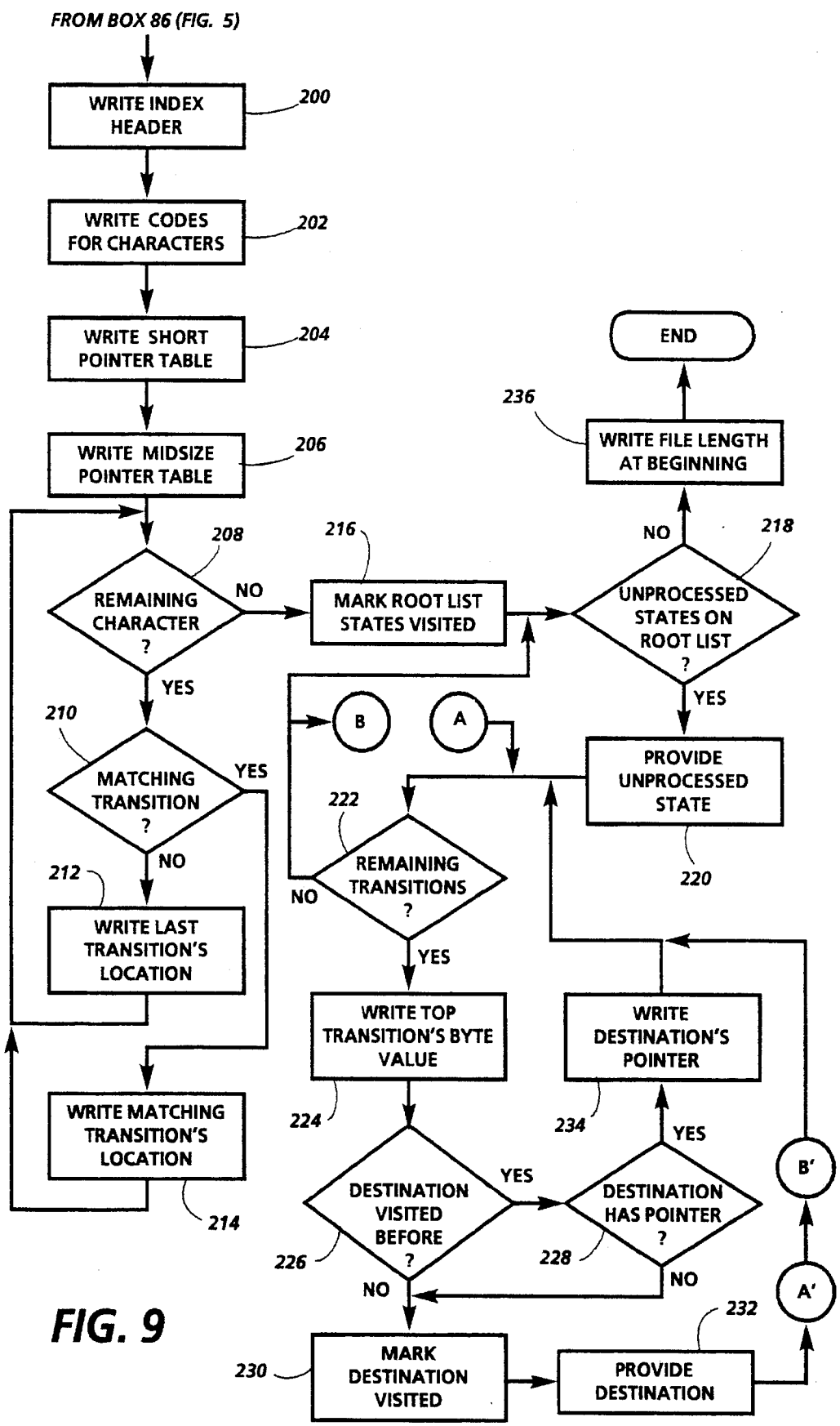
FIG. 9 is a flowchart showing a routine which may be used in FIG. 5 to write a file containing the encoded FSM data structure, including both tables and transition units with assigned byte values in order.

The details of the steps in FIG. 5 can be better understood from FIGS. 6–9, which are flowcharts of more specific implementations of the steps in FIG. 5. FIG. 6 shows in greater detail how the data about the states is obtained in box 82. FIG. 7 shows in greater detail how the pointers are assigned in box 84. FIG. 8 shows how locations are assigned in box 86. FIG. 9 shows how the file is written in box 88. In addition, Appendix A is a source code listing in the Interlisp programming language showing one implementation according to FIGS. 5–9, in which the routine WriteFSMIndex corresponds to FIG. 5; Scan.Measure to FIG. 6; Assign-PointerSizes to part of FIG. 7; Scan.Locate to part of FIG. 8; and Scan.Writefile to part of FIG. 9. Additional information about the Interlisp programming language may be found in *Interlisp Reference Manual*, Xerox Corp., October, 1983. Appendix A includes EvenByte and EvenNumber routines which are implementation dependent routines shifting information to meet alignment criteria. These routines ensure that the pointer tables discussed herein start on even byte addresses, which is useful in some implementations.

The flowchart of FIG. 6 begins with the calling of the subroutine, and the call includes the identification of the state currently being scanned, as shown in box 90. In box 92, a test is performed to check whether the state has been visited before by the subroutine. If so, it has already been scanned and it need not be scanned again since, as described below, the scanning process recursively scans all states which depend on the scanned state in preparation for storing them. Therefore, the block of transition units depending on a previously scanned state need not be stored again, but can be replaced by a pointer to the previously scanned block of transitions. In box 94, InPointers, the number of incoming pointers to that state, is incremented for the pointer which will be used. Then, in box 96, the scan result is set equal to a value Pointer Cost which is an estimate of the size of a pointer index, and this scan result is then returned to the routine within which the routine of FIG. 6 was called.

Similarly, in box 98, a test is performed on a state which has not been visited before to check whether the state has any remaining outgoing transitions. If so, the destinations to which those transitions lead are scanned. The outgoing transitions will be in an order, either arbitrarily or as the result of a sort preceding the encoding process, and in box 100 the destination of the top unscanned transition will be provided in a recursive call to the beginning of the routine shown in FIG. 6, shown as A' to distinguish it from the beginning A of the routine within which it is called. When the recursively called routine is completed, it will return its scan result at B', again distinguished from the return B of the routine within which it is called.

Upon completion of the recursively called routine, a test is made in box 101 to determine whether the cost of the destination exceeds the pointer cost. If so, information for this destination will not normally be reached via a pointer from the current state. If the current state's total cost exceeds a value M which is the maximum cost permitted, however, moving this destination to a remote location and only including a pointer to it within the current state's block may reduce the excess cost. The destination is therefore placed on a list called costlyDests for later consideration. Then the cost of the state from which the outgoing transition led is increased by the cost of a transition unit with a label plus the returned scan result, in box 102. The scan result, of course, is the cost of the destination of the outgoing transition. The cost of a transition unit with a label will typically be one. Then the routine returns to box 98 to test whether further outgoing transitions of the same state remain for scanning.

Because an FSM data structure has only one start state, the recursive routine of FIG. 6 results in the scanning of the entire data structure, beginning with the start state. As each of the outgoing transitions of the start state is scanned, the entire branch of the data structure which depends from that transition is scanned. Therefore, when all the outgoing transitions of the start state have been scanned, the entire data structure has been scanned, all as a result of the recursion contained within the loop including boxes 98–102.

When the outgoing transitions of a state have all been scanned, the cost of the state is tested to determine whether it exceeds a value M which is the maximum cost permitted, in box 104. This maximum cost may be somewhat arbitrary, and serves to limit the time spent passing through the branch depending from a state in order to reach an alternative outgoing transition. The time is reduced because blocks are removed from the branch and replaced with pointers to their locations. These pointers are then skipped when the alternative of the branch is being obtained. If time did not matter at all, and the primary concern were the amount of memory needed to store the data structure, the test in box 104 would be unnecessary.

If the state's cost exceeds M, the costly destinations from that state, as determined in box 101, are sorted according to their respective costs, in box 106. Then a loop begins with box 108 in which the InPointers value of the most costly destination from costlyDests is incremented. Then, in box 110, the block beginning with that most costly destination and including the transitions and states depending from it is moved to Root List. Root List is a list of blocks which will always be accessed by pointers; in other words, each block in Root List begins with a transition unit which will not be located immediately after any of the transition units leading to it. Root List, referred to as "rootList" in the listing of Appendix A, may have as its last element the block beginning with the start state, and the other blocks may be pushed onto the front of the list as they are encountered in this scan of the FSM data structure. Other arrangements of the blocks in Root List could be used, since their relative positions are arbitrary, and the start state could be pushed onto the Root List last.

In box 112, the cost of the present state is increased by the value Pointer Cost, but decreased by the cost of the block moved to Root List. Then, in box 114, the cost is again compared with the value M to determine whether blocks 108–114 should be repeated to bring the state's cost below the maximum.

When the state's cost no longer exceeds the maximum value M, it is returned as the scan result in box 116. This scan result will typically be returned to box 100 of the routine from which the routine of FIG. 6 was recursively called. When the cost being returned is the cost of the start state, however, the scan result will be returned to the overall routine of FIG. 5. In addition to this item of information, the routine of FIG. 6 will have stored the InPointers of the states, permitting the sorting in box 84 of FIG. 5.

FIG. 7 shows in more detail a sequence of steps implementing box 84 of FIG. 5. In box 120, the states of the FSM data structure are sorted according to their respective InPointers values, determined previously, so that states with the highest number of incoming pointers are at the beginning of a sorted list. Then, in box 122, an iterative process of assigning pointer sizes and pointers or pointer indexes to the sorted states begins with the shortest pointer size. In the listing of Appendix A, the shortest pointer indexes are one byte long, the midsize pointer indexes are two bytes long and the long pointers are a full three byte length. Each size has a corresponding number of available values, which will be pointer index values for short and midsize pointers and pointer values for full length pointers.

The number of available pointer indexes or pointers at the current pointer size is compared in box 124 with the current pointer or pointer index to check whether all pointers or indexes of that size have been assigned. If not, a test is performed, determining in box 126 whether the InPointers value of the state at the top of the sorted states is zero.

If the InPointers value is still greater than zero, a test in box 130 determines whether, under the current conditions, a full three byte pointer is necessarily the only appropriate pointer size. In the listing of Appendix A, this will be true not only if the other pointers have been exhausted, but also if the number of InPointers is only one or if the number of InPointers is two and the current pointer size is two. In these latter cases, a shorter pointer size will not be beneficial because, when the number of InPointers is small, the space occupied by the pointer index plus the entry in the pointer table may exceed the space occupied by a full length pointer.

If only a full length pointer could be appropriate, a test is performed in box 132 to determine if a full length pointer would be beneficial in terms of reducing memory space used. This may be done with the routine BeneficialPointer in Appendix A, which returns a value of true if there would be a space benefit in using a pointer of a specific pointer size. BeneficialPointer first tests whether the cost of the present state is greater than or equal to the current pointer size, so that the pointer will not cost more than the present state. If so, BeneficialPointer will return true. For a pointer size equal to three, which is the full length pointer size in Appendix A, BeneficialPointer further tests whether a pointer is nonetheless beneficial because the present state's cost is three or because the present state's cost is two, the destination of its first transition has a cost of at least two and the current pointer size of the destination is not one. Since the pointer size of the destination is not one, it is either nil, meaning that only a pointer size of two or greater could be assigned, or it is already at least two, so that the actual cost of the present state is three or more, making a pointer beneficial. If so, BeneficialPointer also returns true, but if not, it returns false. If a full length pointer would be beneficial, a full length pointer size is assigned to the top state on the sorted list in box 134. After box 134 or if the test in box 132 has a negative result, the routine proceeds to the next sorted state in box 136, returning to begin another iteration at box 124 with the next state as the top state.

If the test in box 130 has a negative result, a test in box 138 determines whether a pointer of the current pointer size would be beneficial, which may again be done using BeneficialPointer. BeneficialPointer will return true if the cost of the present state is greater than the current pointer size. Also, if the current pointer size is two, BeneficialPointer will perform the same test described above for full length pointers, and will return true if a pointer of midsize length would be beneficial. If BeneficialPointer returns true, the top state is assigned the current pointer size and the current pointer index in box 140. The pointer index is then incremented in box 142 and the routine proceeds to the next state in box 136. If the test in box 138 has a negative result, however, and BeneficialPointer returns false, the routine immediately proceeds to the next state in box 136.

The iterations will continue until one of the tests in boxes 124 and 126 has an affirmative result. Then, in box 144, the current pointer index will be returned as the number of pointers of that size which have been assigned. This value may be less than the number of available pointers of that size because pointers are only assigned when beneficial. If the current pointer size is not the longest pointer size, as determined in box 146, the routine proceeds to the next pointer size in box 148, and then returns to box 124. If the longest pointer size has been completed, however, the routine proceeds to the functions in box 86 of FIG. 5, which may be implemented as shown in FIG. 8.

The functions of FIG. 8 may be entered from box 84 in FIG. 5. The first step, in box 158, is to mark the states of the Root List as visited, ensuring that a pointer will be assigned whenever one of those states is visited during this scan. If the Root List has any unprocessed states on it, as tested in box 160, one of the unprocessed states is provided in box 162, and in box 164, the state provided is checked to see if it has a pointer size. If so, the Byte Number, which represents the currently assigned location of a byte in the overall sequence of transition units, is assigned according to the pointer size in box 166. If the pointer size is long, meaning that a full length pointer will be used, the Byte Number is assigned as the value of the full length pointer. Otherwise, the Byte Number is assigned to the position in the appropriate pointer table corresponding to the pointer index assigned to that state. Ordinarily, a state unit of data will not be included in the encoded FSM data structure, so that the Byte Number need not be assigned to the state itself, but only to its first outgoing transition unit. Therefore, the assignment of Byte Numbers in box 166 serves solely to provide pointers to first outgoing transition units where appropriate.

If box 164 has a negative result or when the assignment of the Byte Number in box 166 is completed, values of the Byte Number are assigned to transition units depending from the present state. This begins with a test in box 168 to see whether any of the outgoing transitions from that state remain to have transition units generated and values assigned. If so, a transition unit is generated for the top one of the remaining transitions and the current Byte Number is assigned to it in box 170. Then, the destination of that transition is checked in box 172 for an indication that it has been previously visited during the present iteration through the pointer list. On the first visit to the destination, the result will be negative, and the destination is marked in box 174 with an indication that it has been visited on this iteration. The Byte Number is then incremented in box 176, and the destination is provided in box 178 to begin a recursive call of a part of the routine in FIG. 8. This recursive call begins at A', to be distinguished from the position A at which a calling routine would enter the routine of FIG. 8. Similarly, the recursive call ends at B', distinguished from position B at which a calling routine would exit the routine of FIG. 8. Therefore, the only part of FIG. 8 which is called recursively is the part including boxes 164–182. After a recursive call is completed, another test for remaining transitions is performed in box 168.

If box 172 yields an affirmative result, indicating that the destination has been visited before, another test in box 180 determines whether the destination has a pointer size assigned to it. If not, the transition units depending from the destination are so few that a pointer would not be beneficial, and the same recursion is performed on the destination, through boxes 174–178. Note, however, that the marking of the destination as visited in box 174 is unnecessary in this case, and is only done to simplify programming. If, on the other hand, the destination has a pointer size, a pointer or index will be inserted into the encoded data structure after the current transition unit, pointing to the first outgoing transition from the destination. Therefore, before assigning a Byte Number value to the next transition unit, it is necessary to increase the Byte Number by one plus the pointer size of the destination in box 182.

The functions in boxes 160–182 will be iteratively performed until the states on the Root List have all been assigned Byte Number values. At that point, the test of box 160 will yield a negative result, and the current Byte Number will be returned in box 190. A test in box 192 then determines whether the total number of bytes is greater than the number which can be stored within a space addressable by the current pointer table entry size. If, for example, two byte table entries are being used, or 16 bits, 65,535 bytes will be addressable. The method of the present invention is equally applicable to larger data structures. In such cases, three byte table entries could be used, and more of the byte values from the space of FIG. 4 could be used for the first bytes of full length pointers.

If box 192 determines that the total number of bytes exceeds the addressable bytes, an overflow will occur because the pointer table entries may be inadequate to store the addresses of some transition units to which they point. This overflow may be adjusted in box 194 by an appropriate technique such as increasing the size of the table fields, or, where that would be inefficient, by changing the affected pointers to full length pointers, and leaving the corresponding entries in the pointer tables blank. Since this may affect the locations of other bytes within the overall sequence, however, it is necessary to perform another iteration of the functions in boxes 160–182, but with a visit mark distinct from that used previously. When the overflow has been corrected and the Byte Number values have again been assigned, a negative result will occur in box 192, and the routine will proceed to box 88 in FIG. 5, which may be implemented as shown in FIG. 9.

The functions of FIG. 9 may be entered from box 86 in FIG. 5, as shown, and will write the encoded FSM data structure to a file. First, in box 200, an index header is written containing values necessary during lookup. These values may include a flag to indicate whether the start state is final; the size of the alphabet N; the size of the pointer table entries; the byte values in the byte value map at which the respective types of pointer data units begin; the byte value in the byte value map at which the label bytes begin (256-6N); and the starting locations of each of the tables or blocks of data in the file itself. Then, in box 202, the codes for the characters are written, and will typically be ASCII codes. These codes provide a table which may be used to convert received characters into the values which represent them in the encoded data structure. The next steps are to write the short pointer table in box 204 and the midsize pointer table in box 206, in each case a series of pointers.

The characters of the alphabet are then provided in sequence and iteratively assigned a value in boxes 208–214, resulting in a table of locations for the outgoing transitions of the start state. The value assigned to each character is the location of the first outgoing transition unit from the start state which has a label matching that character. After testing whether a character remains to have a value assigned in box 208, a test is performed in box 210 to determine whether any of the transition units from the start state has a label matching the next of the remaining characters. If not, a standard value will be written in box 212 which will be the location of the last outgoing transition unit from the start state, because this transition unit will be certain to provide a mismatch, the correct result, but will have no alternatives, so that no further comparisons will be made after the mismatch is detected. If a character does have a matching outgoing transition unit, the location of that matching transition unit will be written in box 214. In either case, the test in box 208 for a remaining character is then repeated. The iterative subroutine of boxes 208–214 permits more rapid entry to the outgoing transitions of the start state, and a similar subroutine could be used for speedier access to the outgoing transitions of any other state in the FSM data structure which, rather than having sparse outgoing transitions, has a large number, many of which have large blocks of dependent transition units. This special case could be indicated by allocating one distinctive code byte value for this purpose. When the test in box 208 yields a negative result, the table of first character locations is complete.

As in FIG. 8, the states on the Root List are first marked in box 216 as having been visited on this scan, ensuring that a pointer will be assigned whenever one of those states is visited during this scan. The writing of the transition units of the encoded FSM data structure then occurs in an iterative subroutine including boxes 218–234. A test in box 218 determines whether any unprocessed states remain on the Root List. As discussed above, each of the transition units of the FSM data structure will be within one of the blocks depending from a state on the Root List, with the start state being necessarily included on the Root List. Therefore, by proceeding through the Root List, all the transition units of the encoded FSM data structure will be processed and written out appropriately. When the last has been written, box 218 will have a negative result. In that event, the length of the entire file will then be written into the first location in the file in box 236, before ending the routine.

An unprocessed state from the Root List is provided in box 220 if the test in box 218 has an affirmative result. Then, in box 222, that state is tested for remaining outgoing transitions. If it has none, the test in box 218 is repeated without writing anything, so that the encoded FSM data structure is written without any state unit or other discrete unit of data relating to a state with no outgoing transitions. All of the necessary information about such a state is contained in the transition units leading to it.

If the state has remaining outgoing transitions, a further iterative subroutine proceeds to write appropriate data, beginning with the byte value of the first or top transition unit in box 224. This byte value is based on a byte value map like that of FIG. 4, and the value of the character which is the label of that transition unit is added to the first byte value in the appropriate block of byte values to arrive at the byte value to be written. Which block is appropriate depends on the values of the alternative, final, and EOB bits, as discussed above.

When the byte value of a transition unit has been written, a test in box 226 determines whether the destination of that transition unit has been visited before on this scan. If so, a further test in box 228 determines whether the destination has a pointer to it. If either of these tests yields a negative result, the destination is marked as visited in box 230 and is provided in a recursive call in box 232. This call enters the recursively called routine at A', corresponding to the position A in the routine of FIG. 9. It exits the recursively called routine at B', corresponding to the position B in FIG. 9. Therefore, the recursively called routine includes only the iterative subroutine of boxes 222–234. As in other scans discussed above, the effect of the recursive call will be to write the byte values and pointers of an entire block of the FSM data structure depending from a state on the Root List.

If the tests in boxes 226 and 228 both yield affirmative results, the destination has already been visited and has a pointer, so that it is only necessary to write the destination's pointer in box 234 before returning to box 220. In this case, no recursive call of the routine will be necessary.

Upon completion of the routine of FIG. 9, the file containing the encoded FSM data structure will have contents as shown in FIG. 10. The length of the entire file appears at the first byte location, designated 0. The index header of length L appears in byte locations 1 through L. Then, the ASCII codes corresponding to the characters in sequence appear at byte locations L+1 through L+N. The short pointer table of length S then appears, beginning at byte location L+N+1. The midsize pointer table of length M appears next, beginning at byte location L+N+S+1. The locations of the first transitions from the start state for each character will then be stored, each of length B, beginning at byte location L+N+S+M+1. Finally, the transition units and pointers in the overall sequence according to the pointer list will begin at byte location (L+N(B+1)+S+M+1) and continuing to the end of the file.

The file shown in FIG. 10 may be stored in any appropriate form, including storage on a ROM or on a portable memory medium such as a diskette. When it is used for evaluation of a received character string, a relatively straightforward series of steps, as set forth below, is followed.

D. Using the Encoded FSM Data Structure

The encoding technique according to the invention, as set forth above, determines to a large extent the manner in which the encoded FSM data structure may be used. One specific task in which an encoded FSM data structure is commonly used is the checking or evaluation of a received character string to determine whether it is in the set of strings covered by the FSM. In essence, the FSM data structure is used to look up the received string, and an appropriate signal is provided indicating whether the received string is found.

Figure 11:
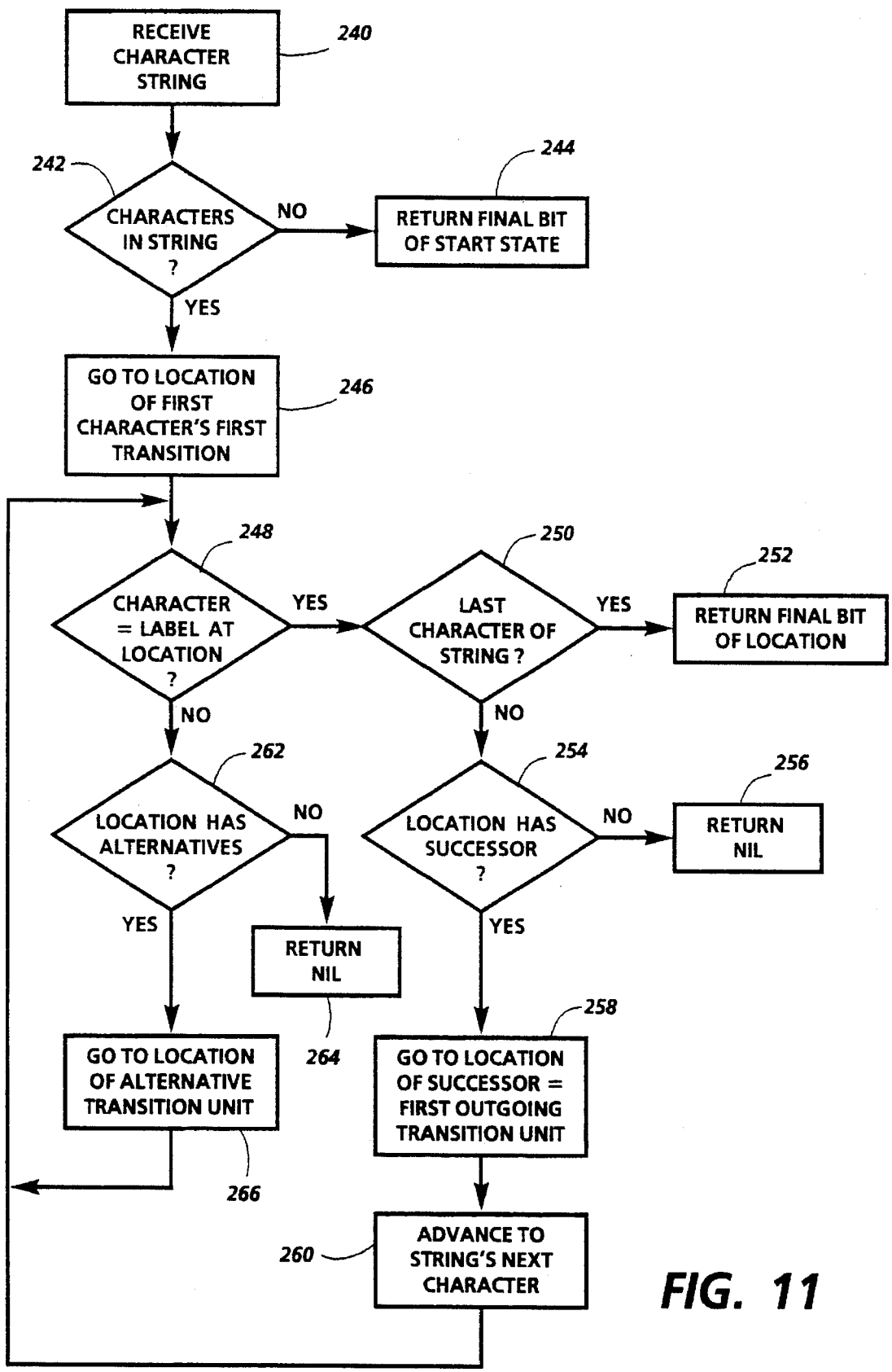
FIG. 11 is a flowchart showing a method for looking up a received character string in the encoded FSM data structure of FIG. 10.

FIG. 11 is a flowchart showing a lookup method suitable for an encoded FSM data structure like that shown in FIG. 10. Appendix B is a listing of a routine in Interlisp programming language called BasicLookup, implementing the method of FIG. 11.

The character string to be looked up in the encoded FSM data structure is received in box 240. A preliminary test in box 242 determines whether the string has any characters, and returns the value of the final bit of the start state in box 244 if there are none, which will indicate whether the FSM data structure accepts the null string. As noted above, the final bit of the start state may be stored in the index header of the file, making this step possible. If, however, the string has at least one character, the routine moves in box 246 to the location specified in the first character lookup table for the first character of the string. This may be done by converting the character from ASCII to the corresponding value in the data structure and then accessing the entry in the first character table corresponding to that value to obtain the location of the transition unit from the start state corresponding to the character. The table entry will be an offset which is added to the location of the first encoded transition unit in the data structure to obtain the actual location of the transition unit sought.

An iterative subroutine then begins with a test at box 248 of whether the character is equal to the label of the transition unit at the current location. If so, the character matches. For the first iteration, a match should ordinarily occur, since the location was obtained by using the character, but for a character which has no outgoing transition from the start state, a match will not occur, because, as noted above, the table entry in the first character table will be the location of a transition unit which is certain not to match.

If a match occurs in box 248, a further test in box 250 determines whether the character is the last of the string, which may be done by comparing the number of the character with the number of characters in the string. If so, all of the characters of the string have matched with labels from transition units, and the only remaining question is whether the last transition unit was final. Therefore, the final bit value of the transition unit in the current location is returned in box 252, indicating by its value whether the string received was in the set covered by the encoded data structure.

If the character which matched is not the last of the received string, a test in box 254 determines whether the current location has a successor, meaning that its destination has at least one outgoing transition unit. If there is a successor, the routine advances to it, that is, to the first outgoing transition unit's location, in box 258. The test in box 254 may begin by checking the EOB bit of the byte value at the current location. If it is a zero, there is a successor, and it may be reached by advancing to the next location in the data structure. If the value there is a pointer, however, the routine will go to the location indicated by the pointer, either directly if a full length pointer or by obtaining the location by entering the appropriate pointer table if a short or midsize pointer index. Note that the appropriate action can be determined from the value stored at the next location, which will be a value either in the label portion or the pointer portion of the byte map of FIG. 4. It is also necessary to advance to the next character in the received string, in box 260, before returning to the test in box 248. If the current location has no successor, nil is returned in box 256, because the further characters of the string cannot be matched, since the current state has no outgoing transitions.

When a mismatch occurs in box 248, the routine must determine whether the transition unit at the current location has an alternative outgoing transition unit, in box 262. This may be done by testing the alternative bit of the current transition unit. As with the final bit and the EOB bit, mentioned above, this test can be done simply by testing the byte value of the transition unit to determine which of the blocks of labels in FIG. 4 includes it. If the transition unit has no alternative, nil is returned in box 264.

If there is an alternative, the routine goes to the location of the alternative in box 266. The routine may move by advancing one location at a time through the data structure, incrementing a counter for each alternative bit encountered and decrementing the counter for each EOB bit encountered, until the counter reaches a value of zero. Any pointers encountered while advancing through the data structure will be skipped over, but the counter will be decremented. This is because the number of alternative bits must be one less than the number of EOB bits within any block pointed to, so that it is necessary to decrement the counter by one, but not to advance through the block of transition units pointed to by the pointer. When the counter finally reaches zero, meaning that the numbers of alternative bits and EOB bits balance, one more step through the data structure will bring the lookup routine to the location of the alternative or to a pointer or index to the alternative. As for locating a successor after a match, above, the byte value at the next location is tested to determine whether it contains a label or is a pointer data unit, leading to the location of an alternative which is shared with another state. Upon reaching the alternative's location, the routine returns to the test of box 248.

The method of FIG. 11 is substantially similar to that of FIG. 2, with box 40 corresponding generally to box 260; box 42 to box 258; box 44 to box 248; box 46 to box 262; box 48 to box 266; and box 50 to box 264. The method of FIG. 11, however, is specifically appropriate to the encoded FSM data structure of FIG. 10.

D. Types of FSM Data Structures

The encoding technique of FIGS. 5–10 will accommodate a number of other variations in an FSM data structure, in addition to the simple deterministic loop-free data structure of FIG. 3A in which each transition is labeled with a single alphabetic character. In some cases, these variations will require a modification of the lookup method, however, due to the changed FSM data structure.

The specific encoding technique of FIGS. 5–10 can, for example, be used with non-deterministic FSM data structures. For non-deterministic data structures, however, the lookup method of FIG. 11 must be modified to permit checking of all outgoing transitions of a state to pick up all the matches, since a state in a non-deterministic data structure may have more than one outgoing transition with a single label. The lookup method could, for example, keep track of the locations at which matching outgoing transitions were encountered, and return to each such transition for alternative matching of the subsequent characters of the received string.

The specific encoding technique of FIGS. 5–10 could also be used with data structures containing loops. The inclusion of loops in the FSM data structure permits the coverage of an infinite set of strings. Looping may, for example, be used in an FSM data structure covering a number of substrings, such as prefixes, which may occur in any order, provided that pointers are properly assigned as in the implementation of Appendix A. The encoding needs no changes, since states reached in a loop will necessarily have pointers assigned. As long as pointers are properly assigned, the lookup method of FIG. 11 should work for a looping data structure.

Some non-deterministic FSM data structures include a special type of transition, called an epsilon or empty transition, which permits an advance through the data structure without advancing to the next element in a received string. Epsilon transitions may be used to reduce the size of an FSM data structure where a number of states have different groups of outgoing transitions, but each group of outgoing transitions shares a common subset with the others. The common subset may then be stored in the appropriate location for one of the states, but the other states may each have an epsilon outgoing transition leading to that common subset. Epsilon transitions could also be used for other purposes, as discussed below.

The use of epsilon transitions requires a few modifications of the encoding technique. For example, the set of characters must include at least one distinct character for the epsilon transition. Rather than treating each epsilon character as an ordinary character, however, it may be appropriate to give it a unique byte value. Therefore, more than one epsilon character, each with a unique byte value, may be required, one with each possible combination of alternative and EOB bits. Note, however, that an epsilon character will be unnecessary in many cases if the epsilon transition is always the last outgoing transition from a state, because the epsilon transition can be encoded simply as a pointer to the first outgoing transition of its destination, except where the destination is final or an EOB. In general, the lookup method will keep track of the location whenever an epsilon transition is encountered, but no attempt will be made to match its label, and the first outgoing transition of the state to which it leads will be accessed.

A number of other variations revolve around additional information stored within the FSM data structure. For example, the data structure may provide an appropriate output whenever a final state is reached. The appropriate output may be stored in a field of predetermined length immediately after each final transition, so that the lookup method skips over the output if further characters remain in the received string, but provides the output if the last character matches the final transition. In this case, the presence of the outputs might be indicated by a bit in the header of the file, and could also be taken into account in calculating state costs. Another approach would make use of epsilon transitions from the final states, with the epsilon transitions leading to the outputs via pointers. This would be especially useful if the same output occurred after many final transitions. Similarly, indexes or pointers in the FSM could lead to the outputs, without the use of epsilon transitions, but this would also require skipping over the index or pointer if further characters remain in the received string.

Another variation is a data structure in which one block of byte values is used to indicate that a second character follows, so that the transition unit contains a pair of values. For example, one value could be compared with a character in a received string and the other could be output if the comparison has a specified result. Or, two strings could be received, and the characters of one could be compared with one of the values while the characters of the other are compared with the other. In this way, an FSM data structure representing a finite state transducer may be encoded.

In general, the techniques of the invention are applicable, with appropriate modifications, to any FSM data structure and may also be applicable to part of a non-FSM data structure if that part includes information about states and transitions, each of which originates in a state and leads to a state.

E. Encoding and Lookup Apparatus

Figure 12:
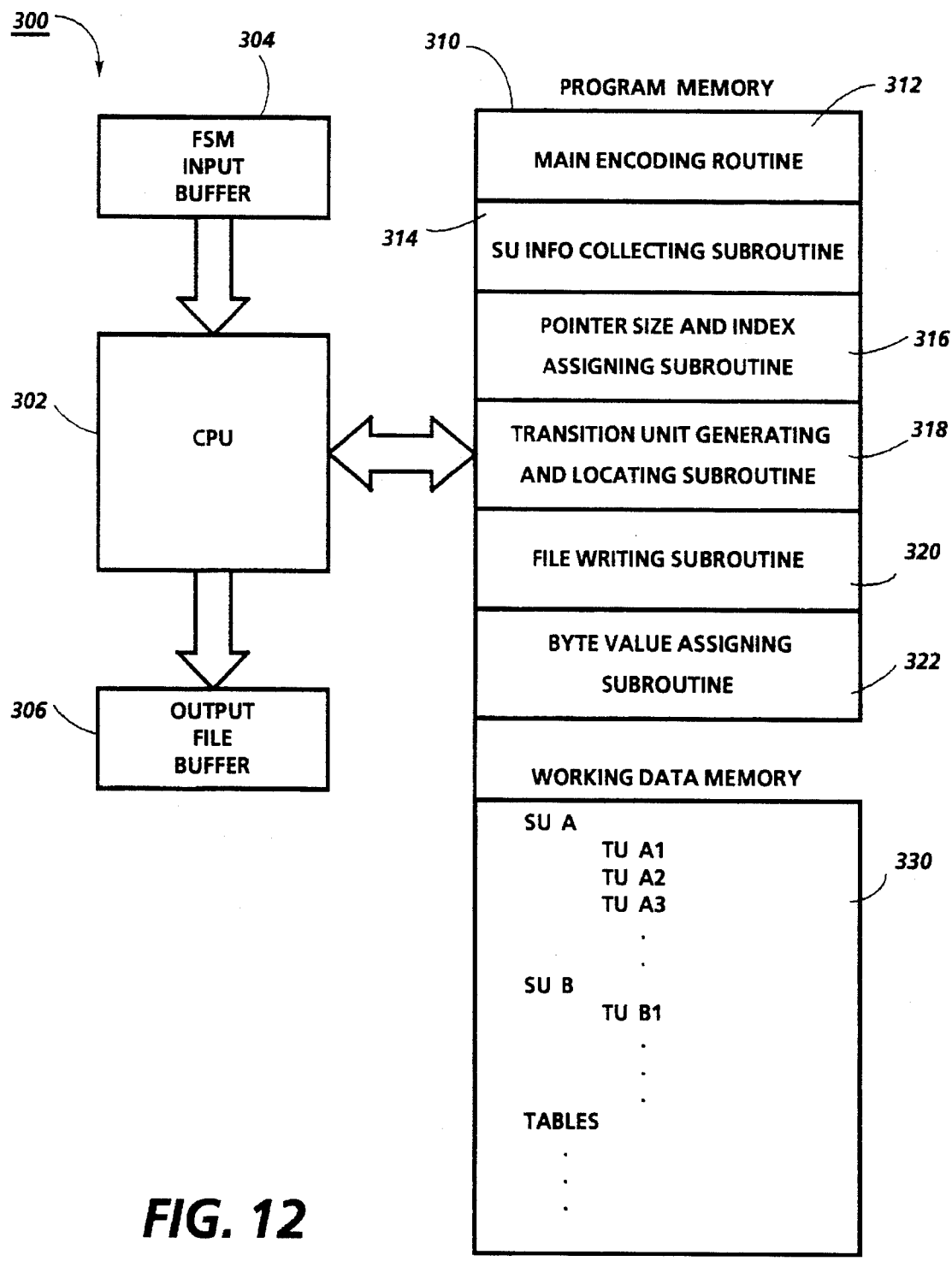
FIG. 12 is a block diagram showing an encoding apparatus according to the invention.
Figure 13:
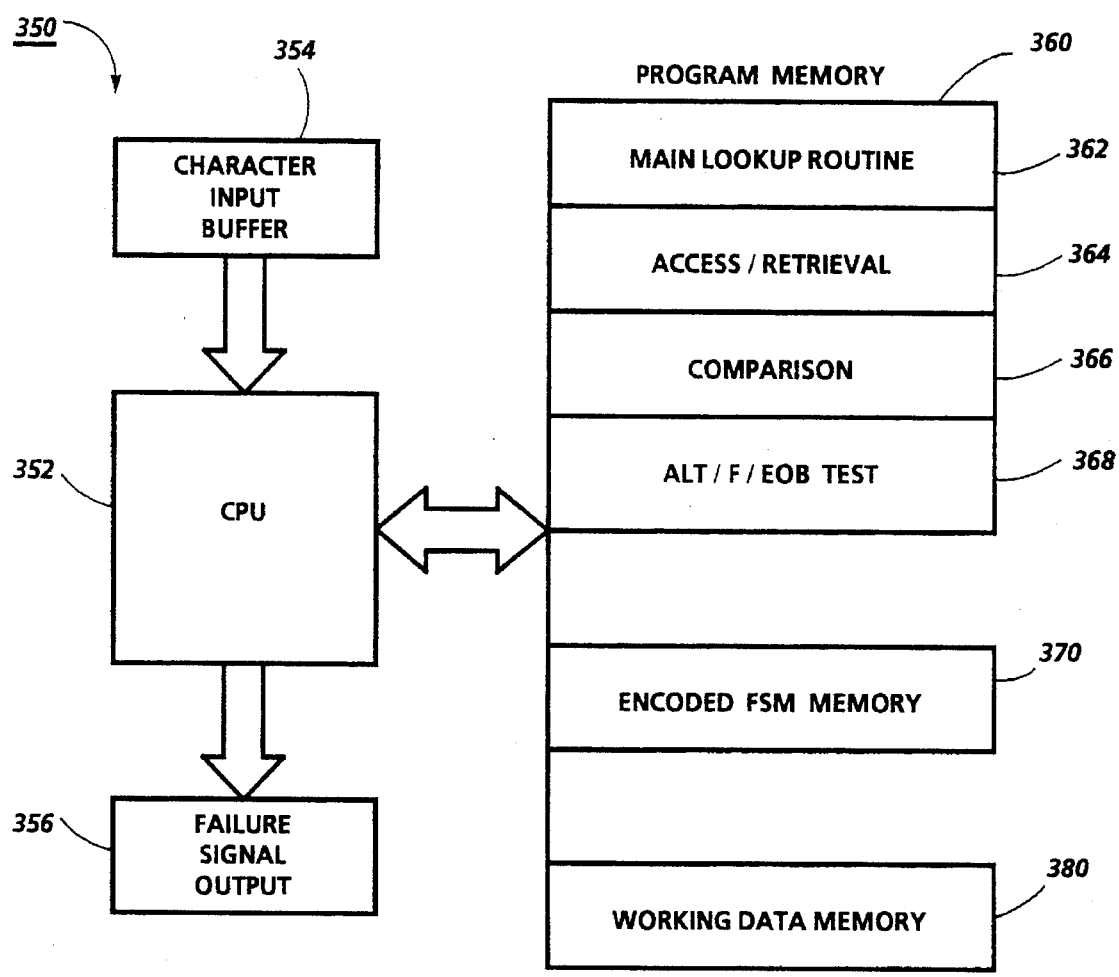
FIG. 13 is a block diagram showing a lookup apparatus according to the invention, including the encoded data structure of FIG. 10.

The techniques of the invention can be implemented in appropriate apparatus to perform the functions of encoding an FSM data structure and looking up a string of received elements in the encoded data structure. FIG. 12 shows apparatus for encoding and FIG. 13 shows lookup apparatus.

Encoding apparatus 300, as shown in FIG. 12, is centered around central processing unit (CPU) 302, which may be any data processing system capable of being programmed to perform the techniques of the invention. The code in Appendix A, for example, is designed to be run on a CPU capable of executing programs in Interlisp, as noted above.

CPU 302 receives the FSM data structure to be encoded from FSM input buffer 304. Buffer 304 is a memory capable of storing the data structure, and if CPU 302 was also used to generate the FSM data structure to be encoded, buffer 304 may simply be a part of the working memory of CPU 302. Similarly, CPU 302 will provide the encoded data structure to output file buffer 306, which may also be a part of the working memory of CPU 302, or may be any other output buffer through which the file may be output for use.

Program memory 310 of CPU 302 stores the program to be executed, such as the code in Appendix A. Program memory 310 illustratively contains a main encoding routine 312 which calls several subroutines, similarly to the method of FIG. 5. The subroutines shown correspond generally to the functions discussed above in relation to FIGS. 6–9. Subroutine 314 collects information about the state units in the FSM data structure, such as the number of incoming pointers and the cost, and can perform the function of limiting the cost of a state. Subroutine 316 assigns pointer sizes and pointer indexes to appropriate states, and may do so according to a sort of the states. Subroutine 318 generates the transition units and assigns locations to them, making it possible to complete the pointer tables. Subroutine 320 writes the file, and may call subroutine 322 to assign a specific byte value to a transition unit according to a byte value map like that of FIG. 4.

During the execution of the program in program memory 310, CPU 302 uses working data memory 330 to store the data structure and other data used to encode it. Working data memory 330 illustratively contains a series of state units (SU), each followed by outgoing transition units (TU) which have been generated from its outgoing transitions, and also a series of tables, such as pointer index tables. When execution of the program has been completed, CPU 302 will have provided the encoded data structure to output file buffer 306.

The lookup apparatus 350 of FIG. 13 resembles the encoding apparatus 300 of FIG. 12 by being centered around a CPU 352. In fact, the same CPU may be used in both apparatus, but programmed differently for the function to be performed. CPU 352 receives the string of characters or other elements to be looked up through character input buffer 354, which may be a conventional input buffer arranged to store a received character string temporarily. Similarly, CPU 352 provides failure signals through failure signal output 356 when it fails to match the received string with the encoded data structure.

In operation, CPU 352 will execute a program stored in program memory 360, and this program may be the code of Appendix B. Program memory 360 illustratively contains main lookup routine 362, corresponding to the method of FIG. 11, and routine 362 may call several subroutines, examples of which are shown. Subroutine 364 accesses a location in the encoded data structure and retrieves the byte stored at that location. Subroutine 366 compares the label from a retrieved byte with a received character to find a match. Subroutine 368 test a retrieved byte to determine the values of its alternative, final, and EOB bits. Other subroutines could be broken out of the main lookup routine 362 for performing other functions.

While executing the program in program memory 360, CPU 352 will keep the encoded data structure in a part of memory designated the encoded FSM memory 370 in FIG. 13. In addition, for the temporary storage of data during the lookup process, CPU 352 will use its working data memory 380. As long as matches are obtained, CPU 352 may continue to look up each of a series of received strings, providing a failure signal only when it finds a string which does not match and is therefore unacceptable to the FSM.

F. Miscellaneous

The present invention has a wide variety of applications. Spelling checking is but one application in which the encoded FSM data structure may be used to check a received string against the set of strings covered. Many other applications will be apparent to those skilled in the art.

The embodiments set forth in the accompanying drawings and in the above description are illustrative of the invention, but the scope of the invention is not limited by the embodiments described, but only by the claims.

G. Glossary

As used herein, the following words have the following meanings:

Finite State Machine (FSM): A data processing system having a finite number of states and transitions (or arcs), each transition originating in a state and leading to a state; the FSM responds to an input signal by following one of the transitions originating in its present state.

FSM data structure: A data structure containing information sufficient to define the states and transitions of an FSM.

State unit: A unit of data in an FSM data structure which contains information about one of the states of the FSM.

Transition unit: A unit of data in an FSM data structure which contains information about at least one corresponding transition of the FSM.

String: An ordered series of elements.

Substring: An ordered series of elements which forms part of a string.

Pointer: A discrete unit of data defining the location of another unit of data.

Appendix A

```
(* Copyright (c) 1985 by Xerox Corporation. All rights reserved.)

(PRETTYCOMPRINT WRITEFSMINDEXCOMS).

(RPAQQ WRITEFSMINDEXCOMS ((RECORDS StateInfo WRITEINDEXARC WRITEINDEXSTATE)
        (CONSTANTS (ShortPointerCost 1)
                   (LabelCost 1))
        (FNS AssignPointerSizes AdjustPointerOverflow AdjustPointerOverflow.1 BeneficialPointer
             PrepareFSM Scan.Measure Scan.Locate Scan.Locate1 Scan.Writefile Scan.Writefile1
             WriteCharByte WriteFileLength WriteFSMIndex WriteIndexHeader WritePointer
             WritePointerTable WriteStateTransitionTable)
        (FNS EvenByte EvenNumber)
        (MACROS BOUT2 BOUT3)))
[DECLARE: EVAL@COMPILE (RECORD StateInfo (nInPointers stateCost pointerSize pointerIndex))

(ACCESSFNS WRITEINDEXARC ((arcLoc (fetch (ARC ARCSCHEMATA) of DATUM)
                                  (replace (ARC ARCSCHEMATA) of DATUM with NEWVALUE))))

(ACCESSFNS WRITEINDEXSTATE ((STATEINFO (fetch (STATE NAME) of DATUM)
                                       (replace (STATE NAME) of DATUM with NEWVALUE))))
]
(DECLARE: EVAL@COMPILE (RPAQQ ShortPointerCost 1)

(RPAQQ LabelCost 1)

(CONSTANTS (ShortPointerCost 1)
           (LabelCost 1))
)
(DEFINEQ (AssignPointerSizes
  [LAMBDA (currentPointerSize nPointers)
    (DECLARE (USEDFREE sortedStates))
    (bind state stateInfo nInPointers (pindex ← 0) while (SETQ state (pop sortedStates))
      until [OR (EQ pindex nPointers)
                (EQ 0 (SETQ nInPointers (fetch (StateInfo nInPointers)
                                                of (SETQ stateInfo (fetch STATEINFO
                                                                           of state]
      do (if (OR (EQ currentPointerSize 3)
                 (EQ nInPointers 1)
                 (AND (EQ nInPointers 2)
                      (EQ currentPointerSize 2)))
             then
                (if (BeneficialPointer state 3)
                    then (replace (StateInfo pointerSize) of stateInfo with 3))
             elseif (BeneficialPointer state currentPointerSize)
                then (replace (StateInfo pointerSize) of stateInfo with currentPointerSize)
                     (replace (StateInfo pointerIndex) of stateInfo with pindex)
                     (add pindex 1))
      finally (RETURN pindex])

(AdjustPointerOverflow
  [LAMBDA (states 1BytePointerArray 2BytePointerArray)
    (for s stateInfo in states
      count (SETQ stateInfo (fetch STATEINFO of s))
            (SELECTQ (fetch (StateInfo pointerSize) of stateInfo)
                     (1 (AdjustPointerOverflow.1 1BytePointerArray stateInfo))
                     (2 (AdjustPointerOverflow.1 2BytePointerArray stateInfo))
                     NIL])

(AdjustPointerOverflow.1
  [LAMBDA (table stateInfo)
    (LET ((index (fetch (StateInfo pointerIndex) of stateInfo)))
      (if (GREATERP (ELT table index)
                    65535)
          then (replace (StateInfo pointerSize) of stateInfo with 3)
               (replace (StateInfo pointerIndex) of stateInfo with (ELT table index))
```

```
                        (SETA table index 0)
                        T])
(BeneficialPointer
  [LAMBDA (state pointersize)
    (LET [(stateCost (fetch (StateInfo stateCost) of (fetch STATEINFO of state]
         (OR (GREATERP stateCost pointersize)
             (SELECTQ pointersize
                      (1
                        NIL)
                      ((2 3)
                        (SELECTQ stateCost
                                 (3 (EQ pointersize 3))
                                 [2
                                   (LET [(destinfo (fetch STATEINFO
                                                          of (fetch DESTINATION
                                                                    of (CAR (fetch ARCSET
                                                                                   of state]
                                        (AND (GEQ (fetch (StateInfo stateCost)
                                                         of destinfo)
                                                  2)
                                             (NEQ 1 (fetch (StateInfo pointerSize)
                                                           of destinfo]
                                 NIL))
                      (HELP])
(PrepareFSM
  [LAMBDA (fsm)
    (for s in (fetch STATES of fsm)
        do (replace STATEINFO of s with NIL)
           (replace VISITMARK of s with 0))
    (replace VISITMARKSDIRTY of fsm with T)
    (replace SORTEDSTATES of fsm with NIL])
(Scan.Measure
  [LAMBDA (state maxStateCost)
    (PROG ((stateInfo (fetch STATEINFO of state)))
          (if stateInfo
              then
                (RETURN (if (fetch ARCSET of state)
                            then (add (fetch (StateInfo nInPointers) of stateInfo)
                                      1)
                                 ShortPointerCost
                            else 0)))
          (SETQ stateInfo (create StateInfo
                                  nInPointers ← 0
                                  stateCost ← 0))
          (replace STATEINFO of state with stateInfo)
          (LET (stateCost costlyDests (arcset (fetch ARCSET of state)))
               (SETQ stateCost (for arc dest destCost in arcset
                                    sum (SETQ destCost (Scan.Measure (fetch DESTINATION
                                                                            of arc)
                                                                     maxStateCost))
                                        (if (GREATERP destCost ShortPointerCost)
                                            then (push costlyDests (fetch DESTINATION
                                                                          of arc)))
                                        (PLUS LabelCost destCost)))
               [if (GREATERP stateCost maxStateCost)
                   then [SETQ costlyDests (SORT costlyDests
                                                (FUNCTION (LAMBDA (a b)
                                                    (GEQ (fetch (StateInfo stateCost)
                                                                of (fetch STATEINFO
                                                                          of a))
                                                         (fetch (StateInfo stateCost)
                                                                of (fetch STATEINFO
                                                                          of b]
                        (for dest destinfo in costlyDests while (GREATERP stateCost
                                                                          maxStateCost)
                             do (SETQ destinfo (fetch STATEINFO of dest))
                                (add (fetch (StateInfo nInPointers) of destinfo)
                                     1)
                                (push rootList dest)
                                (add stateCost (IDIFFERENCE ShortPointerCost
                                                            (fetch (StateInfo stateCost)
                                                                   of destinfo]
               (replace (StateInfo stateCost) of stateInfo with stateCost)
               (RETURN stateCost])
```

```
(Scan.Locate
  [LAMBDA (roots)
    (LET ((visitMark (IMOD (ADD1 (fetch VISITMARK of (CAR roots)))
                           2)))
      (for rstate in roots do (replace VISITMARK of rstate with visitMark))
      (for rstate (nextByteNumber ← 0) in roots declare (SPECVARS nextByteNumber)
           do (Scan.Locate1 rstate visitMark) finally (RETURN (SUB1 nextByteNumber])

(Scan.Locate1
  [LAMBDA (state visitMark)
    (DECLARE (USEDFREE nextByteNumber 1BytePointerArray 2BytePointerArray))
    (LET ((stateInfo (fetch STATEINFO of state)))
      (SELECTQ (fetch (StateInfo pointerSize) of stateInfo)
               (1 (SETA 1BytePointerArray (fetch (StateInfo pointerIndex) of stateInfo)
                        nextByteNumber))
               (2 (SETA 2BytePointerArray (fetch (StateInfo pointerIndex) of stateInfo)
                        nextByteNumber))
               (3 (replace (StateInfo pointerIndex) of stateInfo with nextByteNumber))
               NIL))
    (bind destination destinfo pointerSize for arc in (fetch ARCSET of state)
       do (replace arcLoc of arc with nextByteNumber)
          (SETQ destination (fetch DESTINATION of arc))
          (SETQ destinfo (fetch STATEINFO of destination))
          (COND
            ((AND (EQ visitMark (fetch VISITMARK of destination))
                  (SETQ pointerSize (fetch (StateInfo pointerSize) of destinfo)))
             (add nextByteNumber 1 pointerSize))
            (T (replace VISITMARK of destination with visitMark)
               (add nextByteNumber 1)
               (Scan.Locate1 destination visitMark])

(Scan.Writefile
  [LAMBDA (roots charArray alphabetBase Offset1 Offset2 Offset3 file)
    (DECLARE (SPECVARS charArray alphabetBase Offset1 Offset2 Offset3))
    (EvenByte file)
    (LET ((visitMark (IMOD (ADD1 (fetch VISITMARK of (CAR roots)))
                           2)))
      (for rstate in roots do (replace VISITMARK of rstate with visitMark))
      (for rstate in roots do (Scan.Writefile1 rstate visitMark file])

(Scan.Writefile1
  [LAMBDA (state visitMark file)
    (bind arc dest destinfo pointerSize for tail on (fetch ARCSET of state)
       do (SETQ arc (CAR tail))
          (SETQ dest (fetch DESTINATION of arc))
          (SETQ destinfo (fetch STATEINFO of dest))
          (WriteCharByte (fetch LABEL of arc)
                         (CDR tail)
                         (fetch FINALP of dest)
                         (NULL (fetch ARCSET of dest))
                         file)
          (COND
            ((AND (EQ visitMark (fetch VISITMARK of dest))
                  (SETQ pointerSize (fetch (StateInfo pointerSize) of destinfo)))
             (WritePointer pointerSize (fetch (StateInfo pointerIndex) of destinfo)
                           file))
            (T (replace VISITMARK of dest with visitMark)
               (Scan.Writefile1 dest visitMark file])

(WriteCharByte
  [LAMBDA (char alt final eob file)
    (DECLARE (USEDFREE alphabetBase CharArray))
    (BOUT file (IPLUS alphabetBase (ELT CharArray char)
                      (ITIMES alphabetSize (IPLUS (if eob
                                                      then 1
                                                      else 0)
                                                  (if final
                                                      then 1
                                                      else 0)
                                                  (if (EQ (NOT alt)
                                                          (NOT eob))
                                                      then 0
                                                      else 3])

(WriteFileLength
  [LAMBDA (file)
```

```
        (LET ((L (GETFILEPTR file)))
             [if (RANDACCESSP file)
                 then (SETFILEPTR file 0)
                 else
                     (RESETSAVE (SETQ file (OPENSTREAM (CLOSEF file)
                                                        (QUOTE OUTPUT)
                                                        (QUOTE OLD))))
                                (QUOTE (PROGN (CLOSEF? OLDVALUE)
                                              (AND RESETSTATE (DELFILE OLDVALUE]
        (BOUT3 file L])

(WriteFSMIndex
  [LAMBDA (fsm file maxStateCost PointerEntrySize n2BytePointerCodes n3BytePointerCodes)
    (OR maxStateCost (SETQ maxStateCost 1000))
    (OR PointerEntrySize (SETQ PointerEntrySize 2))
    (RESETLST [AND file (RESETSAVE (SETQ file (OPENSTREAM file (QUOTE OUTPUT)
                                                               (QUOTE NEW))))
                        (QUOTE (PROGN (CLOSEF? OLDVALUE)
                                      (AND RESETSTATE (DELFILE OLDVALUE]
              (LET* ((alphabet (SORT (SIGMA fsm)))
                     (alphabetSize (LENGTH alphabet))
                     (rootList (LIST (fetch STARTSTATE of fsm)))
                     (alphabetBase (IDIFFERENCE 256 (ITIMES 6 alphabetSize)))
                     (n2BytePointerCodes (MAX (OR n2BytePointerCodes 6)
                                               1))
                     (n3BytePointerCodes (MAX (OR n3BytePointerCodes 2)
                                               1))
                     (n1BytePointers (IDIFFERENCE alphabetBase (IPLUS n2BytePointerCodes
                                                                      n3BytePointerCodes)))
                     (1BytePointerArray (ARRAY n1BytePointers NIL 0 0))
                     (n2BytePointers (ITIMES n2BytePointerCodes 256))
                     (2BytePointerArray (ARRAY n2BytePointers NIL 0 0))
                     (CharArray (ARRAY 256 NIL NIL 0))
                     sortedStates nUsed1BytePointers nUsed2BytePointers lastByte (Offset1 0)
                     (Offset2 (IPLUS Offset1 n1BytePointers))
                     (Offset3 (IDIFFERENCE alphabetBase n3BytePointerCodes)))
                (DECLARE (SPECVARS . T))
                (PrepareFSM fsm)
                (Scan.Measure (fetch STARTSTATE of fsm)
                              maxStateCost)
                [SETQ sortedStates (SORT (fetch STATES of fsm)
                                         (FUNCTION (LAMBDA (s1 s2)
                                                     (GEQ (fetch (StateInfo nInPointers)
                                                                 of (fetch STATEINFO
                                                                            of s1))
                                                          (fetch (StateInfo nInPointers)
                                                                 of (fetch STATEINFO
                                                                            of s2]
                (SETQ nUsed1BytePointers (AssignPointerSizes 1 n1BytePointers
                                                             PointerEntrySize))
                (SETQ nUsed2BytePointers (AssignPointerSizes 2 n2BytePointers
                                                             PointerEntrySize))
                (AssignPointerSizes 3 T 0)
                (SETQ lastByte (Scan.Locate rootList))
                [if (GEQ lastByte (LLSH 1 (ITIMES PointerEntrySize 8)))
                    then (while (GREATERP (AdjustPointerOverflow (fetch STATES
                                                                         of fsm)
                                                                   1BytePointerArray
                                                                   2BytePointerArray)
                                            0)
                                do
                                (SETQ lastByte (Scan.Locate rootList]
                (WriteIndexHeader alphabetSize alphabetBase PointerEntrySize Offset1 Offset2
                                  Offset3 nUsed1BytePointers nUsed2BytePointers fsm file)
                (for char in alphabet as n from 0
                     do (BOUT file char)
                        (SETA CharArray char n))
                (WritePointerTable 1BytePointerArray nUsed1BytePointers PointerEntrySize file)
                (WritePointerTable 2BytePointerArray nUsed2BytePointers PointerEntrySize file)
                (WriteStateTransitionTable (fetch STARTSTATE of fsm)
                                           alphabet file)
                (Scan.Writefile rootList CharArray alphabetBase Offset1 Offset2 Offset3 file)
                (WriteFileLength file)
                (CLOSEF file])

(WriteIndexHeader
  [LAMBDA (alphabetSize alphabetBase PointerEntrySize Offset1 Offset2 Offset3 nUsed1BytePointers
```

```
                                        nUsed2BytePointers fsm file)
    (LET (currentTableLoc (headerlength 20))
         (BOUT3 file 0)
         (BOUT file (if (fetch FINALP of (fetch STARTSTATE of fsm))
                        then 1
                        else 0))
         (BOUT file alphabetSize)
         (BOUT file PointerEntrySize)
         (BOUT file Offset1)
         (BOUT file Offset2)
         (BOUT file Offset3)
         (BOUT file alphabetBase)
         (SETQ currentTableLoc (EvenNumber headerlength))
         (BOUT2 file currentTableLoc)
         (SETQ currentTableLoc (EvenNumber (IPLUS currentTableLoc alphabetSize)))
         (BOUT2 file currentTableLoc)
         [SETQ currentTableLoc (EvenNumber (IPLUS currentTableLoc (ITIMES nUsed1BytePointers
                                                                         PointerEntrySize]
         (BOUT2 file currentTableLoc)
         [SETQ currentTableLoc (EvenNumber (IPLUS currentTableLoc (ITIMES nUsed2BytePointers
                                                                         PointerEntrySize]
         (BOUT2 file currentTableLoc)
         [SETQ currentTableLoc (EvenNumber (IPLUS currentTableLoc (ITIMES alphabetSize 3]
         (BOUT2 file currentTableLoc)
         (EvenByte file])

(WritePointer
  [LAMBDA (size index file)
    (DECLARE (USEDFREE Offset1 Offset2 Offset3))
    (SELECTQ size
             (1 (BOUT file (IPLUS Offset1 index)))
             (2 (BOUT file (IPLUS Offset2 (LRSH index 8)))
                (BOUT file (LOGAND index 255)))
             (3 (BOUT file (IPLUS Offset3 (LRSH index 16)))
                (BOUT2 file (LOGAND index 65535)))
             NIL])

(WritePointerTable
  [LAMBDA (table nUsed pointerEntrySize file)
    (EvenByte file)
    (for i from 0 to (SUB1 nUsed) do (if (EQ pointerEntrySize 2)
                                         then (BOUT2 file (ELT table i))
                                         else (BOUT3 file (ELT table i])

(WriteStateTransitionTable
  [LAMBDA (state alphabet file)
    (EvenByte file)
    (for char [nomatch ←(fetch arcLoc of (CAR (LAST (fetch ARCSET of state]
         in alphabet do (for a in (fetch ARCSET of state)
                            when (EQ char (fetch LABEL of a))
                            do (BOUT3 file (fetch arcLoc of a))
                               (RETURN)
                            finally (BOUT3 file nomatch])
)
(DEFINEQ (EvenByte
  [LAMBDA (file)
    (OR (EVENP (GETFILEPTR file))
        (BOUT file 0])

(EvenNumber
  [LAMBDA (n)
    (if (EVENP n)
        then n
      else (ADD1 n])
)
(DECLARE: EVAL@COMPILE
[PUTPROPS BOUT2 MACRO (OPENLAMBDA (f v)
                                  (BOUT f (LRSH v 8))
                                  (BOUT f (LOGAND v 255]
[PUTPROPS BOUT3 MACRO (OPENLAMBDA (f v)
                                  (BOUT f (LRSH v 16))
                                  (BOUT2 f (LOGAND v 65535]
)
```

APPENDIX B

```
(* Copyright (c) 1985 by Xerox Corporation. All rights reserved.)

(PRETTYCOMPRINT BASICLOOKUPCOMS)

(RPAQQ BASICLOOKUPCOMS ((FNS BasicLookup)
                       (FNS AltCharLoc DecodePointer NextCharLoc)
                       (FNS FILETOARRAYBLOCK)
                       (RECORDS MWINDEXHEADER)
                       (MACROS DictChar EndOfBranch? EowP FirstCharLoc GetPointerTableEntry
                               HasAlt? MatchChar? TableBase WordChar)
                       (MACROS Bytes2 Bytes3 Get2 Get3 GetByte)
                       (MACROS WITH-FSMINDEX)
                       (ALISTS (PRETTYEQUIVLST WITH-FSMINDEX))))
(DEFINEQ (BasicLookup
  [LAMBDA (word index)
    (WITH-FSMINDEX index
      (if (EQ 0 (NCHARS word))
          then (fetch startFinalp of index)
        else (bind (char# ← 1)
                   [loc ←(FirstCharLoc (WordChar (NTHCHARCODE word 1]
                do (if (MatchChar? loc (WordChar (NTHCHARCODE word char#)))
                       then (if (EQ char# (NCHARS word))
                                then (RETURN (EowP loc))
                              elseif (SETQ loc (NextCharLoc loc))
                                then (add char# 1)
                              else (RETURN NIL))
                     elseif (HasAlt? loc)
                       then (SETQ loc (AltCharLoc loc))
                     else (RETURN NIL])
)
(DEFINEQ (AltCharLoc
  [LAMBDA (loc)
    (DECLARE (USEDFREE fsmBase altCounter changeCounter alphaBase decrementCounter offSet2
                       offSet3))
    (LET ((byte (GetByte fsmBase loc)))
      (if (OR (ILESSP byte altCounter)
              (IGEQ byte decrementCounter))
          then
                NIL
        elseif (ILESSP byte changeCounter)
          then (DecodePointer (ADD1 loc))
        else
              (bind (counter ← 1) until (EQ counter 0)
                 do (add loc 1)
                    (SETQ byte (GetByte fsmBase loc))
                    (if (IGEQ byte alphaBase)
                        then (if (IGEQ byte changeCounter)
                                 then (if (IGEQ byte decrementCounter)
                                          then
                                                (add counter -1)
                                        else
                                                (add counter 1)))
                      elseif (IGEQ byte offSet2)
                        then (add counter -1)
                             (if (IGEQ byte offSet3)
                                 then
                                       (add loc 2)
                               else
                                       (add loc 1))
                      else
                             (add counter -1))
                 finally
                         (RETURN (DecodePointer (ADD1 loc])

(DecodePointer
  [LAMBDA (loc)
    (DECLARE (USEDFREE fsmBase alphaBase offSet1 offSet3 offSet2 table1 table2 pointerEntrySize))
```

```
            (LET ((byte (GetByte fsmBase loc)))
                 (if (IGEQ byte alphaBase)
                     then
                             loc
                  elseif (IGEQ byte offSet3)
                     then
                             (Get3 fsmBase loc)
                  elseif (IGEQ byte offSet2)
                     then
                             [GetPointerTableEntry table2 (IPLUS (LLSH (IDIFFERENCE byte offSet2)
                                                                       8)
                                                                 (GetByte fsmBase (ADD1 loc]
                     else
                             (GetPointerTableEntry table1 (IDIFFERENCE byte offSet1])

(NextCharLoc
  -[LAMBDA (loc)
    (if (NOT (EndOfBranch? loc))
        then
               (DecodePointer (ADD1 loc])
)
(DEFINEQ (FILETOARRAYBLOCK
  [LAMBDA (FILE)
    (RESETLST (PROG (LENGTH BLOCK STREAM)
                    [RESETSAVE (SETQ STREAM (OPENSTREAM FILE (QUOTE INPUT)
                                                             (QUOTE OLD)))
                               (QUOTE (PROGN (CLOSEF OLDVALUE]
                    (SETQ LENGTH (GETEOFPTR STREAM))
                    (SETQ BLOCK (\ALLOCBLOCK (LRSH (IPLUS 3 LENGTH)
                                                    2)))
                    (\BINS STREAM BLOCK 0 LENGTH)
                    (RETURN BLOCK])
)
[DECLARE: EVAL@COMPILE (BLOCKRECORD MWINDEXHEADER ((NIL 3 BYTE )
                            (NIL BITS 7 )
                            (startFinalp FLAG )
                            (alphabetSize BYTE )
                            (pointerEntrySize BYTE )
                            (offset1 BYTE )
                            (offset2 BYTE )
                            (offset3 BYTE )
                            (alphabetBase BYTE )
                            (alphabetTable WORD )
                            (table1 WORD )
                            (table2 WORD )
                            (startStateIndex WORD )
                            (fsmBase WORD
                                    ))
                            [ACCESSFNS ([fileLength (LOGOR (LLSH (\GETBASEBYTE DATUM 0)
                                                                  16)
                                                            (LLSH (\GETBASEBYTE DATUM 1)
                                                                   8)
                                                            (\GETBASEBYTE DATUM 2))
                                                     (PROGN (\PUTBASEBYTE DATUM 0
                                                                           (LRSH NEWVALUE 16))
                                                            (\PUTBASEBYTE DATUM 1
                                                                           (LOGAND
                                                                             (LRSH NEWVALUE 8)
                                                                             255))
                                                            (\PUTBASEBYTE DATUM 2
                                                                           (LOGAND NEWVALUE
                                                                                   255]
                                        (table1Length (IQUOTIENT (IDIFFERENCE
                                                                   (fetch (MWINDEXHEADER
                                                                             table2)
                                                                          of DATUM)
                                                                   (fetch (MWINDEXHEADER
                                                                             table1)
                                                                          of DATUM))
                                                                 (fetch (MWINDEXHEADER
                                                                           pointerEntrySize)
                                                                        of DATUM)))
                                        (table2Length (IQUOTIENT (IDIFFERENCE
```

```
                                                (fetch (MWINDEXHEADER
                                                               startStateIndex)
                                                 of DATUM)
                                                (fetch (MWINDEXHEADER
                                                               table2)
                                                 of DATUM))
                                               (fetch (MWINDEXHEADER
                                                               pointerEntrySize)
                                                of DATUM])
]
(DECLARE: EVAL@COMPILE
(PUTPROPS DictChar MACRO ((loc)

(IREMAINDER (IDIFFERENCE (GetByte fsmBase loc)
                                   alphaBase)
                      alphabetSize)))
[PUTPROPS EndOfBranch? MACRO ((loc)

(DECLARE (USEDFREE fsmBase decrementCounter altCounter changeCounter))
          (LET ((byte (GetByte fsmBase loc)))
               (OR (IGEQ byte decrementCounter)
                   (AND (IGEQ byte altCounter)
                        (ILESSP byte changeCounter]
[PUTPROPS EowP MACRO ((loc)

(LET ((byte (GetByte fsmBase loc)))
               (OR (IGEQ byte (IPLUS alphaBase (ITIMES alphabetSize 4)))
                   (AND (IGEQ byte (IPLUS alphaBase alphabetSize))
                        (ILESSP byte changeCounter]
[PUTPROPS FirstCharLoc MACRO ((char)

(Bytes3 startStateIndex (ITIMES (MIN char (SUB1 alphabetSize))
                                          3]
[PUTPROPS GetPointerTableEntry MACRO ((table offset)
          (COND ((EQ pointerEntrySize 2)
                 (Get2 table offset))
                (T (Bytes3 table (ITIMES offset 3]
[PUTPROPS HasAlt? MACRO ((loc)
          (LET ((byte (GetByte fsmBase loc)))
               (AND (IGEQ byte altCounter)
                    (ILESSP byte decrementCounter]
(PUTPROPS MatchChar? MACRO ((loc char)

(EQ (DictChar loc)
              char)))
[PUTPROPS TableBase MACRO ((byteLoc)

(\ADDBASE index (LRSH byteLoc 1]
[PUTPROPS WordChar MACRO ((char)

(for j from 0 to (SUB1 alphabetSize)
               when
               (EQ char (GetByte alphabetTable j))
               do
               (RETURN j)
               finally
               (RETURN 256]
)
(DECLARE: EVAL@COMPILE
[PUTPROPS Bytes2 MACRO (OPENLAMBDA (table loc)

(LOGOR (LLSH (\GETBASEBYTE table loc)
                                                8)
                                          (\GETBASEBYTE table (ADD1 loc]
[PUTPROPS Bytes3 MACRO (OPENLAMBDA (table loc)

(LOGOR (LLSH (\GETBASEBYTE table loc)
                                                16)
                                          (LLSH (\GETBASEBYTE table (ADD1 loc))
                                                8)
                                          (\GETBASEBYTE table (IPLUS loc 2]
[PUTPROPS Get2 MACRO (OPENLAMBDA (table offset)

(Bytes2 table (LLSH offset 1]
[PUTPROPS Get3 MACRO (OPENLAMBDA (base loc)

(LOGOR (LLSH (IDIFFERENCE (\GETBASEBYTE base loc)
```

```
                                                        offSet3)
                                        16)
                               (LLSH (\GETBASEBYTE base (ADD1 loc))
                                        8)
                               (\GETBASEBYTE base (IPLUS loc 2]
(PUTPROPS GetByte MACRO ((base loc)

(\GETBASEBYTE base loc)))
)
(DECLARE: EVAL@COMPILE
[PUTPROPS WITH-FSMINDEX MACRO ((FSMINDEX . FORMS)

(DECLARE (SPECVARS . T))
        (LET ((index FSMINDEX))
            (OR (\BLOCKDATAP index)
                (ERROR "index not an array block" index))
            (LET [(alphabetSize (fetch alphabetSize of index))
                  (alphaBase (fetch alphabetBase of index))
                  (pointerEntrySize (fetch pointerEntrySize of index))
                  (table1 (TableBase (fetch table1 of index)))
                  (table2 (TableBase (fetch table2 of index)))
                  (offSet1 (fetch offset1 of index))
                  (offSet2 (fetch offset2 of index))
                  (offSet3 (fetch offset3 of index))
                  (alphabetTable (TableBase (fetch alphabetTable of index)))
                  (startStateIndex (TableBase (fetch startStateIndex of index)))
                  (fsmBase (TableBase (fetch fsmBase of index)]
                (LET [(altCounter (IPLUS alphaBase (ITIMES alphabetSize 2)))
                      (decrementCounter (IPLUS alphaBase (ITIMES alphabetSize 5)))
                      (changeCounter (IPLUS alphaBase (ITIMES alphabetSize 3]
                    (PROGN . FORMS]
)
(ADDTOVAR PRETTYEQUIVLST (WITH-FSMINDEX . LAMBDA))
(PUTPROPS BASICLOOKUP.NOCOMMENTS COPYRIGHT ("Xerox Corporation" 1985))
(DECLARE: DONTCOPY
   (FILEMAP (NIL (639 1317 (BasicLookup 649 . 1315)) (1318 3196 (AltCharLoc 1328 . 2459) (DecodePointer
2461 . 3065) (NextCharLoc 3067 . 3194)) (3197 3683 (FILETOARRAYBLOCK 3207 . 3681))))))
STOP
```

What is claimed:

1. An article of manufacture for use in a machine that includes a processor, the article comprising:

memory for storing data, the data stored in the memory being accessible by the processor when the article is used in the machine; and string data stored in the memory; the string data indicating a set of strings of elements; the string data comprising two or more data units stored in the memory so that the processor can access the stored data units to search the stored data units with a string of elements;

the stored data units including a series of two or more subsequences of data units that each includes subsequence label information indicating at least one of a set of labels and subsequence search information for use by the processor in searching the stored data units with a string of elements, each element being an instance of one of the set of labels; the subsequence search information of each subsequence in the series including:

subsequence next information indicating either that the subsequence has a next subsequence of data units to which the processor can continue if a current element in the string is an instance of the label indicated by the subsequence label information or that the subsequence does not have a next subsequence; and subsequence alternative information indicating either that the subsequence has an alternative subsequence of data units to which the processor can continue if the current element in the string is not an instance of the label indicated by the subsequence label information or that the subsequence does not have an alternative subsequence;

the stored data units being ordered in the memory with the series of subsequences positioned such that the processor can access a first one of the subsequences and, if the first subsequence's next information indicates that the first subsequence has a next subsequence of data units, access the next subsequence by advancing to an immediately following subsequence, the immediately following subsequence being the first subsequence's next subsequence, and such that the processor can access the first subsequence and, if the first subsequence's alternative information indicates that the first subsequence has an alternative subsequence of data units, access the alternative subsequence using only the subsequence next information and the subsequence alternative information of subsequences between the first subsequence and its alternative subsequence.

2. The article of claim 1 in which the memory has two or more locations that are accessible by the processor when the article is used in the machine; each of the stored data units being stored in one of the locations in the memory.

3. The article of claim 2 in which each of the memory locations is of equal size.

4. The article of claim 1 in which the first subsequence's next information indicates that the first subsequence has a next subsequence, the stored data units further including a second subsequence of data units that is the next subsequence of the first subsequence.

5. The article of claim 4 in which the second subsequence has a position in the series that immediately follows the position of the first subsequence.

6. The article of claim 1 in which the first subsequence of data units includes a first data unit, the first data unit including the first subsequence's label information and the first subsequence's alternative information.

7. The article of claim 6 in which the first subsequence of data units includes only the first data unit; the first data unit further including the first subsequence's next information.

8. The article of claim 6 in which the first data unit is a single byte.

9. The article of claim 1 in which the first subsequence's next information indicates that the first subsequence has a next subsequence; the next subsequence being a pointer subsequence that the processor can use to continue searching the stored data units.

10. The article of claim 9 in which the pointer subsequence is a pointer that the processor can use directly to obtain a location at which to continue searching.

11. The article of claim 9 in which the string data further comprise a pointer table that the processor can access to obtain a location in the memory; the pointer subsequence being a pointer index that the processor can use to access the pointer table and obtain a location in the memory at which to continue searching.

12. The article of claim 1 in which the first subsequence's alternative information indicates that the first subsequence has an alternative subsequence; the alternative subsequence being a pointer subsequence that the processor can use to continue searching the stored data units.

13. The article of claim 12 in which the pointer subsequence is a pointer that the processor can use directly to obtain a location in the memory at which to continue searching.

14. The article of claim 12 in which the string data further comprise a pointer table that the processor can access to obtain a location in the memory; the pointer subsequence being a pointer index that the processor can use to access the pointer table and obtain a location in the memory at which to continue searching.

15. An article of manufacture for use in a machine that includes a processor, the article comprising:

memory for storing data, the data stored in the memory being accessible by the processor when the article is used in the machine; and string data stored in the memory; the string data indicating a set of strings of elements; the string data comprising two or more data units stored in the memory so that the processor can access the stored data units to search the stored data units with a string of elements;

the stored data units including a series of two or more data units; each data unit in the series including label information indicating at least one of a set of labels and search information for use by the processor in searching the stored data units with a string of elements, each element being an instance of one of the set of labels;

the search information of each data unit in the series including:

next information indicating either that the data unit has a next data unit to which the processor can continue if a current element in the string is an instance of the label indicated by the label information or that the data unit does not have a next data unit; and alternative information indicating either that the data unit has an alternative data unit to which the processor can continue if the current element in the string is not an instance of the label indicated by the label information or that the data unit does not have an alternative data unit;

each of the data units in the series having one of a set of two or more label byte values, each of the set of label byte values being within one of two or more blocks, all of the label byte values in each block having equivalent next information and alternative information;

the stored data units being ordered in the memory with the series of data units positioned such that the processor can access a first one of the data units and, if the first data unit's next information indicates that the first data unit has a next data unit, access the next data unit by advancing to an immediately following data unit, the immediately following data unit being the first data unit's next data unit, and such that the processor can access the first data unit and, if the first data unit's alternative information indicates that the first data unit has an alternative data unit, access the alternative data unit using only the next information and the alternative information of data units between the first data unit and its alternative data unit.

16. The article of claim 15 in which each of the data units in the series is a single byte.

17. The article of claim 15 in which the search information of each of the data units in the series of two or more subsequences further includes final information indicating whether the label indicated by the data unit's label information is a label that ends an acceptable string so that when the processor searches the stored data units with a string of elements and accesses the data unit when the current element is an element that ends the string of elements and is an instance of the label indicated by the data unit's label information, the processor can determine from the final information whether the string of elements is acceptable.

18. An article of manufacture for use in a machine that includes a processor, the article comprising:

memory for storing data; the memory having two or more locations that are accessible by the processor when the article is used in the machine; each of the memory locations holding a single byte of data;

string data stored in the memory; the string data indicating a set of strings of elements; the string data comprising two or more data units stored in the memory so that the processor can access the stored data units to search the stored data units with a string of elements; each of the stored data units being a single byte that is stored in one of the locations in the memory;

the stored data units including a series of two or more data units; each data unit in the series including label information indicating at least one of a set of labels and search information for use by the processor in searching the stored data units with a string of elements, each element being an instance of one of the set of labels;

the search information of each data unit in the series including:

next information indicating either that the data unit has a next data unit to which the processor can continue if a current element in the string is an instance of the label indicated by the label information or that the data unit does not have a next data unit; and alternative information indicating either that the data unit has an alternative data unit to which the processor can continue if the current element in the string is not an instance of the label indicated by the label information or that the data unit does not have an alternative data unit;

each of the data units in the series having one of a set of two or more label byte values, each of the set of label byte values being within one of two or more blocks, all of the label byte values in each block having equivalent next information and alternative information;

the stored data units being ordered in the memory with the series of data units positioned such that the processor can access a first one of the data units and, if the first data unit's next information indicates that the first data unit has a next data unit, access the next data unit by advancing to an immediately following data unit, the immediately following data unit being the first data unit's next data unit, and such that the processor can access the first data unit and, if the first data unit's alternative information indicates that the first data unit has an alternative data unit, access the alternative data unit using only the next information and the alternative information of data units between the first data unit and its alternative data unit.

19. A method of operating a machine; the machine including:

memory for storing data;

a processor connected for accessing data stored in the memory; and string data stored in the memory; the string data indicating a set of strings of elements; the string data comprising two or more data units stored in the memory so that the processor can access the stored data units to search the stored data units with a string of elements;

the stored data units including a series of two or more subsequences of data units that each includes subsequence label information indicating at least one of a set of labels and subsequence search information for use by the processor in searching the stored data units with a string of elements, each element being an instance of one of the set of labels;

the subsequence search information of each subsequence in the series including:

subsequence next information indicating either that the subsequence has a next subsequence of data units to which the processor can continue if a current element in the string is an instance of the label indicated by the subsequence label information or that the subsequence does not have a next subsequence; and subsequence alternative information indicating either that the subsequence has an alternative subsequence of data units to which the processor can continue if the current element in the string is not an instance of the label indicated by the subsequence label information or that the subsequence does not have an alternative subsequence;

the stored data units being ordered in the memory with the series of subsequences positioned such that the processor can access a first one of the subsequences and, if the first subsequence's next information indicates that the first subsequence has a next subsequence of data units, access the next subsequence by advancing to an immediately following subsequence, the immediately following subsequence being the first subsequence's next subsequence, and such that the processor can access the first subsequence and, if the first subsequence's alternative information indicates that the first subsequence has an alternative subsequence of data units, access the alternative subsequence using only the subsequence next information and the subsequence alternative information of subsequences between the first subsequence and its alternative subsequence;

the method comprising:

operating the processor to obtain a string of elements;

operating the processor to search the stored data units with the string of elements; the act of operating the processor to search comprising:

accessing the first subsequence;

using the first subsequence's label information and a current element in the string of elements to obtain match data indicating whether the first subsequence's label information indicates the current element;

if the first subsequence's label information indicates the current element and if the first subsequence's next information indicates that the first subsequence has a next subsequence, accessing the next subsequence by advancing to the immediately following subsequence; and if the first subsequence's label information does not indicate the current element and if the first subsequence's alternative information indicates that the first subsequence has an alternative subsequence, accessing the alternative subsequence using only the subsequence next information and the subsequence alternative information of subsequences between the first subsequence and its alternative subsequence.

20. The method of claim 19 in which the act of accessing the alternative subsequence comprises:

keeping a first count of subsequences that have subsequence next information indicating a next subsequence and keeping a second count of subsequences that have subsequence alternative information indicating an alternative subsequence until reaching a subsequence at which the first and second counts are equal; and advancing to an immediately following subsequence.

* * * * *